US012375140B2

(12) United States Patent
Islam et al.

(10) Patent No.: US 12,375,140 B2
(45) Date of Patent: Jul. 29, 2025

(54) MAPPING BETWEEN A CONTROL BEAM AND A DATA CHANNEL BEAM

(71) Applicant: QUALCOMM Incorporated, San Diego, CA (US)

(72) Inventors: Muhammad Nazmul Islam, Littleton, MA (US); Sundar Subramanian, San Diego, CA (US); Bilal Sadiq, Basking Ridge, NJ (US); Navid Abedini, Somerset, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/537,964

(22) Filed: Aug. 12, 2019

(65) Prior Publication Data

US 2019/0363770 A1 Nov. 28, 2019

Related U.S. Application Data

(63) Continuation of application No. 15/426,878, filed on Feb. 7, 2017, now Pat. No. 10,411,777.
(Continued)

(51) Int. Cl.
*H04W 72/00* (2023.01)
*H04B 7/06* (2006.01)
(Continued)

(52) U.S. Cl.
CPC ......... *H04B 7/0617* (2013.01); *H04B 7/0695* (2013.01); *H04L 5/0044* (2013.01);
(Continued)

(58) Field of Classification Search
CPC ... H04B 7/0617; H04L 5/0053; H04L 5/0044; H04W 16/28; H04W 72/0406
See application file for complete search history.

(56) References Cited

U.S. PATENT DOCUMENTS 8,565,193 B2   10/2013   Ylitalo
9,184,806 B2   11/2015   Kim et al.
(Continued)

FOREIGN PATENT DOCUMENTS

CN   101091344 A   12/2007
CN   104885377 A   9/2015
(Continued)

OTHER PUBLICATIONS

International Preliminary Report on Patentability—PCT/US2017/047845, The International Bureau of WIPO—Geneva, Switzerland, dated Feb. 26, 2019.
(Continued)

*Primary Examiner* — Lakeram Jangbahadur
(74) *Attorney, Agent, or Firm* — Procopio, Cory, Hargreaves & Savitch LLP/QUALCOMM Incorporated

(57) ABSTRACT

There is a need for a beam tracking technique that reduces the time needed to perform a beamforming procedure and that reduces beam overhead. The apparatus may determine a mapping between a first beam associated with a first type of channel and a second beam associated with a second type of channel. In an aspect, the first type of channel may be different than the second type of channel. The apparatus may receive the first beam associated with the first type of channel and the second beam associated with the second type of channel. In an aspect, the first beam and the second beam may be received from a second device.

70 Claims, 11 Drawing Sheets

Related U.S. Application Data

(60) Provisional application No. 62/379,208, filed on Aug. 24, 2016.

(51) Int. Cl.
*H04L 5/00* (2006.01)
*H04W 16/28* (2009.01)
*H04W 72/20* (2023.01)

(52) U.S. Cl.
CPC ........... *H04L 5/0053* (2013.01); *H04W 16/28* (2013.01); *H04W 72/20* (2023.01)

(56) References Cited

U.S. PATENT DOCUMENTS

| | | | |
|---|---|---|---|
| 9,252,907 | B2 | 2/2016 | Bhattad et al. |
| 2007/0243831 | A1 | 10/2007 | Seki |
| 2009/0033359 | A1 | 2/2009 | Rofougaran |
| 2013/0286960 | A1* | 10/2013 | Li .................... H04B 7/0617 370/329 |
| 2013/0295852 | A1 | 11/2013 | Kim et al. |
| 2014/0198763 | A1* | 7/2014 | Sorrentino .......... H04L 27/2675 370/330 |
| 2015/0201369 | A1* | 7/2015 | Ng .................... H04W 48/12 370/254 |
| 2015/0208443 | A1* | 7/2015 | Jung ................ H04W 74/0833 370/329 |
| 2015/0282122 | A1* | 10/2015 | Kim .................... H04B 7/0639 370/329 |
| 2016/0020876 | A1 | 1/2016 | Raghavan et al. |
| 2016/0021548 | A1 | 1/2016 | Raghavan et al. |
| 2016/0080060 | A1* | 3/2016 | Yu .................... H04B 7/0626 455/452.2 |
| 2016/0095102 | A1* | 3/2016 | Yu .................... H04W 72/046 455/452.2 |
| 2016/0353510 | A1* | 12/2016 | Zhang ................ H04B 7/0617 |
| 2018/0062720 | A1 | 3/2018 | Islam et al. |
| 2018/0212727 | A1* | 7/2018 | Davydov ............... H04B 7/024 |
| 2018/0254813 | A1* | 9/2018 | Gao .................... H04B 7/0632 |
| 2019/0261329 | A1* | 8/2019 | Park .................... H04L 5/0048 |
| 2020/0304256 | A1* | 9/2020 | Park .................... H04L 5/0053 |

FOREIGN PATENT DOCUMENTS

| | | |
|---|---|---|
| CN | 104955061 A | 9/2015 |
| CN | 104956611 A | 9/2015 |
| CN | 105580455 A | 5/2016 |
| JP | 2015523757 A | 8/2015 |
| JP | 2015532805 A | 11/2015 |
| KR | 20090051127 A | 5/2009 |
| WO | 2006070478 A1 | 7/2006 |
| WO | 2007088624 A1 | 8/2007 |
| WO | 2007111266 A1 | 10/2007 |
| WO | 2013165149 A1 | 11/2013 |
| WO | 2016127403 A1 | 8/2016 |

OTHER PUBLICATIONS

International Search Report and Written Opinion—PCT/US2017/047845—ISA/EPO—dated Oct. 27, 2017.
Huawei, Hisilicon: "Beam Management Procedure for NR MIMO" [online], 3GPP Draft, 3GPP TSG-RAN WG1#86, R1-166089, Aug. 26, 2016, 6 Pages, Retrieved from the Internet URL:http://www.3gpp.org/ftp/tsg_ran/WG1_RL1/TSGR1_120/Docs/R1-166089.zip.
Qualcomm Incorporated: "Beam Management in Millimeter Wave Systems" [online], 3GPP Draft, 3GPP TSG-RAN WG1#86, R1-166389, Aug. 26, 2016, 4 Pages, Retrieved from the Internet: URL:http://www.3gpp.org/ftp/tsg_ran/WG1_RL1/TSGR1_414/Docs/R1-166389.zip.
CMCC: "Gradual UE-Specific (GUS) Initial Access and Multi-Beam-Based Mobility Management, 3GPP TSG RAN WG1 Meeting #86, R1-167114, Goteborg, Sweden, Aug. 10-14, 2016, 6 Pages, URL: https://www.3gpp.org/ftp/TSG_RAN/WG1_RL1/TSGR1_86/Docs/R1-167114.zip.
Huawei., et al., "Discussion on Control Channel Design", 3GPP TSG RAN WG1 Meeting #86, 3GPP Draft, R1-167203, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, 6 Pages, XP051125772, Aug. 21, 2016, Retrieved from the Internet: URL: http://www.3gpp.org/ftp/Meetings_3GPP_SYNC/RAN1/DoCs [retrieved on Aug. 21, 2016].
Partial European Search Report—EP23176393—Search Authority—The Hague—Sep. 29, 2023.
European Search Report—EP23176393—Search Authority—The Hague—Feb. 8, 2024.

\* cited by examiner

MAPPING BETWEEN A CONTROL BEAM AND A DATA CHANNEL BEAM

CROSS-REFERENCE TO RELATED APPLICATION(S)

This application is a Continuation of U.S. patent application Ser. No. 15/426,878, entitled "MAPPING BETWEEN A CONTROL BEAM AND A DATA CHANNEL BEAM" and filed on Feb. 7, 2017, which claims the benefit of U.S. Provisional Application Ser. No. 62/379,208, entitled "MAPPING BETWEEN CONTROL AND DATA BEAMS" and filed on Aug. 24, 2016, both of which are expressly incorporated by reference herein in their entirety.

BACKGROUND

Field

The present disclosure relates generally to communication systems, and more particularly, to a mapping between a control channel beam and a data channel beam.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

One way to meet the increasing demand for mobile broadband may be to utilize the millimeter wave (mmW) spectrum in addition to LTE. However, communications using the mmW radio frequency band have extremely high path loss and a short range. Beamforming may be used to compensate for the extreme high path loss and short range. Beamforming techniques and methods are currently needed for providing seamless and continuous coverage for a UE operating in the mmW radio frequency band.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One way to meet the increasing demand for mobile broadband may be to utilize the mmW spectrum in addition to LTE. Communications using the mmW radio frequency band have extremely high path loss and a short range. Beamforming may be used to compensate for the extreme high path loss and short range. However, due to the potentially large number of antennas at an mmW base station and subarrays at a user equipment (UE), the number of possible beams that may need to be scanned during a beamforming procedure can be quite large especially when a control channel and an associated data channel are transmitted using different beams. A scanning process for a large number of potential beams may take an undesirable amount of time and create significant beam overhead. There is a need for a beam tracking technique that reduces the time needed to perform a beamforming procedure and that reduces beam overhead.

The present disclosure provides a solution to the problem by providing a relationship between the beam used for a control channel and a beam used for the associated data channel. In a first aspect, the beam used for the control channel and the beam used for the associated data channel may be correlated via an explicit mapping or an implicit mapping of the different beams. In a second aspect, the relationship between the beam used for the control channel and the beam used for the associated data channel may be independent, without an explicit or implicit mapping. In the second aspect, the beams may be selected without any correlation therebetween based on signaling that indicates which beam will be used for the control channel and which beam will be used for the data channel. In this way, the present disclosure may speed up the beamforming procedure and reduce beam overhead by decreasing the number of potential beams that may need to be scanned.

In an aspect of the disclosure, a method, a computer-readable medium, and an apparatus are provided. The apparatus may determine a mapping between a first beam associated with a first type of channel and a second beam associated with a second type of channel. In an aspect, the first type of channel may be different than the second type of channel. The apparatus may receive the first beam associated with the first type of channel and the second beam associated with the second type of channel. In an aspect, the first beam and the second beam may be received from a second device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
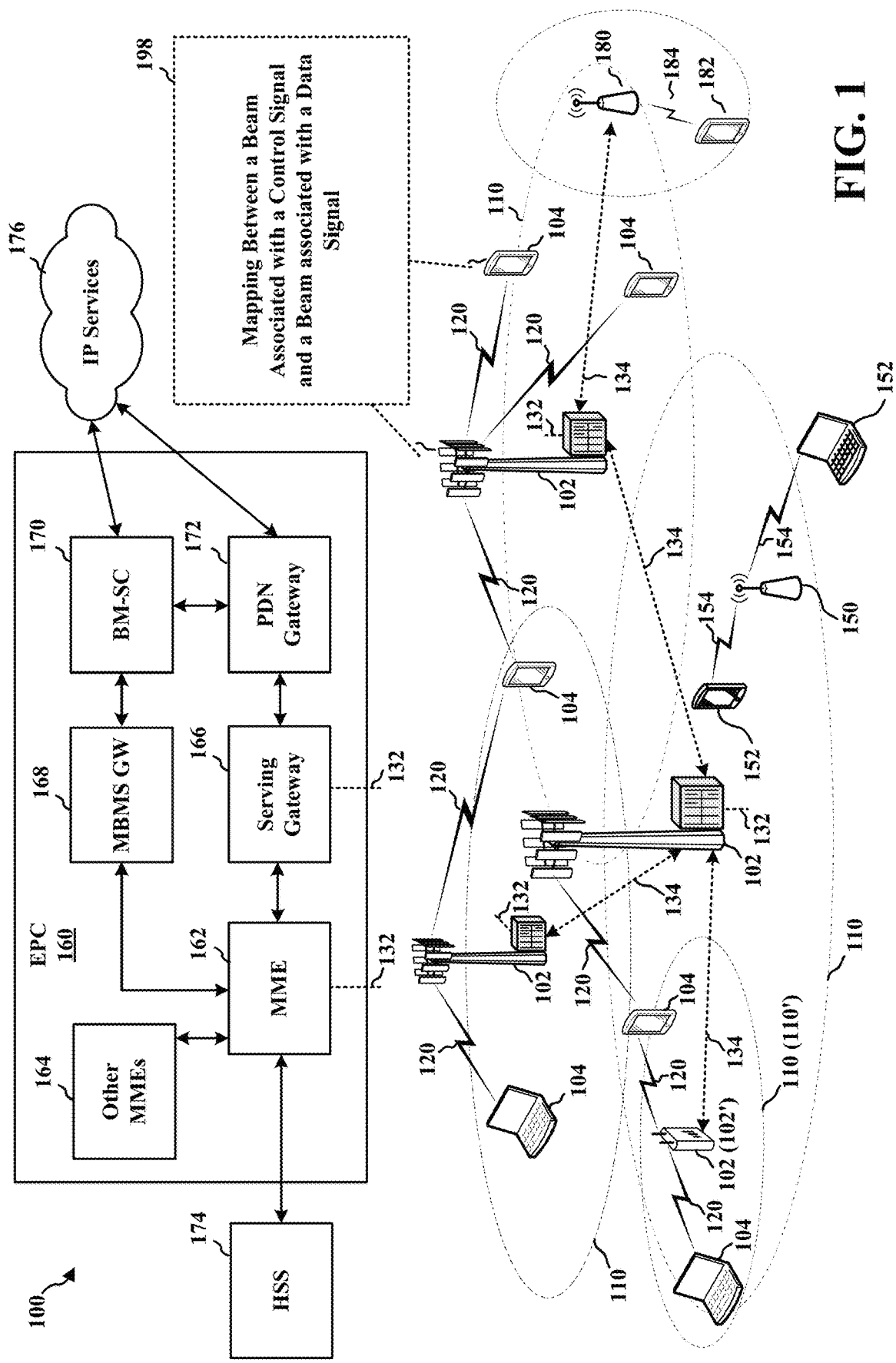
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and mmW base station 180 may be configured to determine a mapping between a beam used for a control channel and a different beam used for an associated data channel (198).

Figure 2:
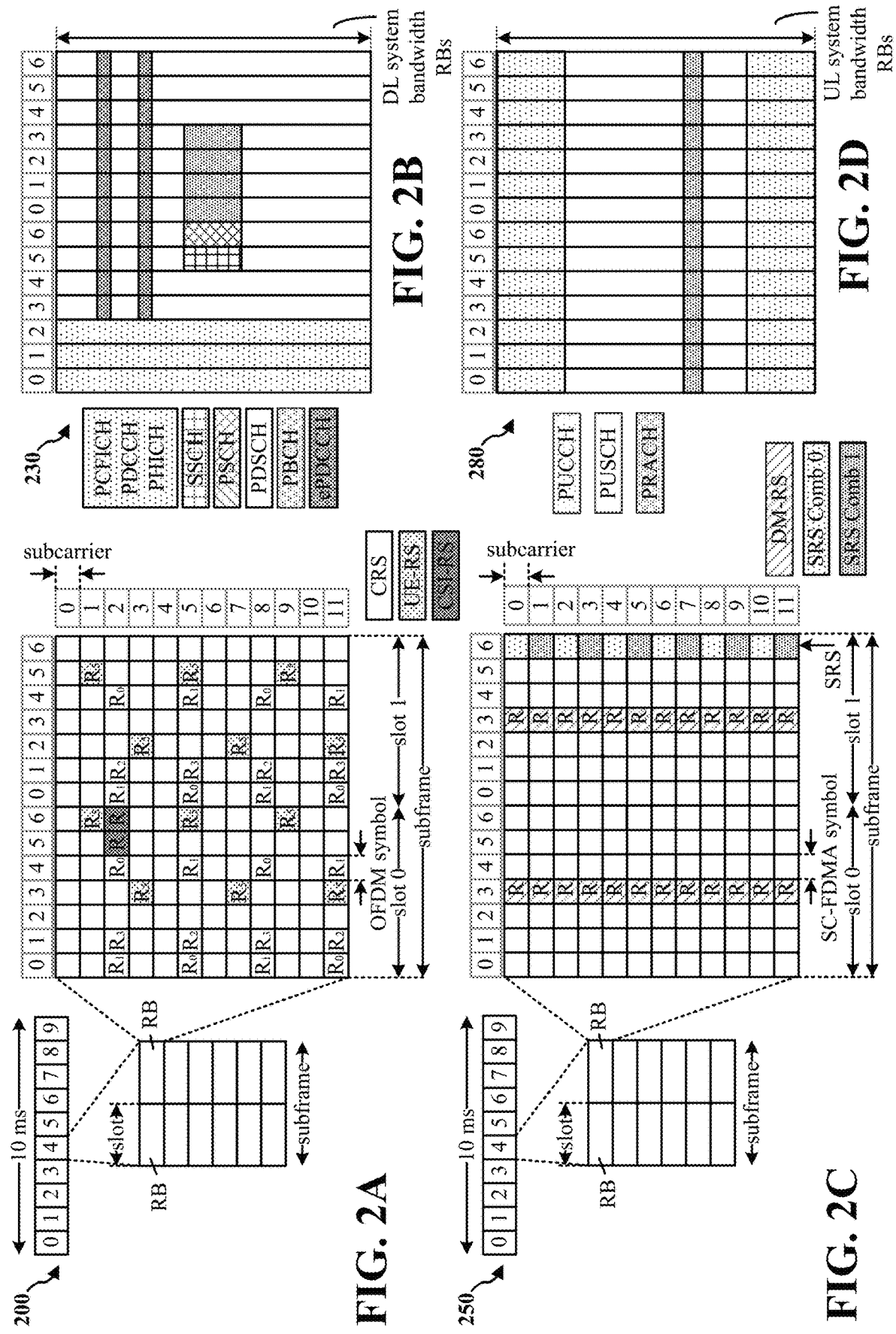
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
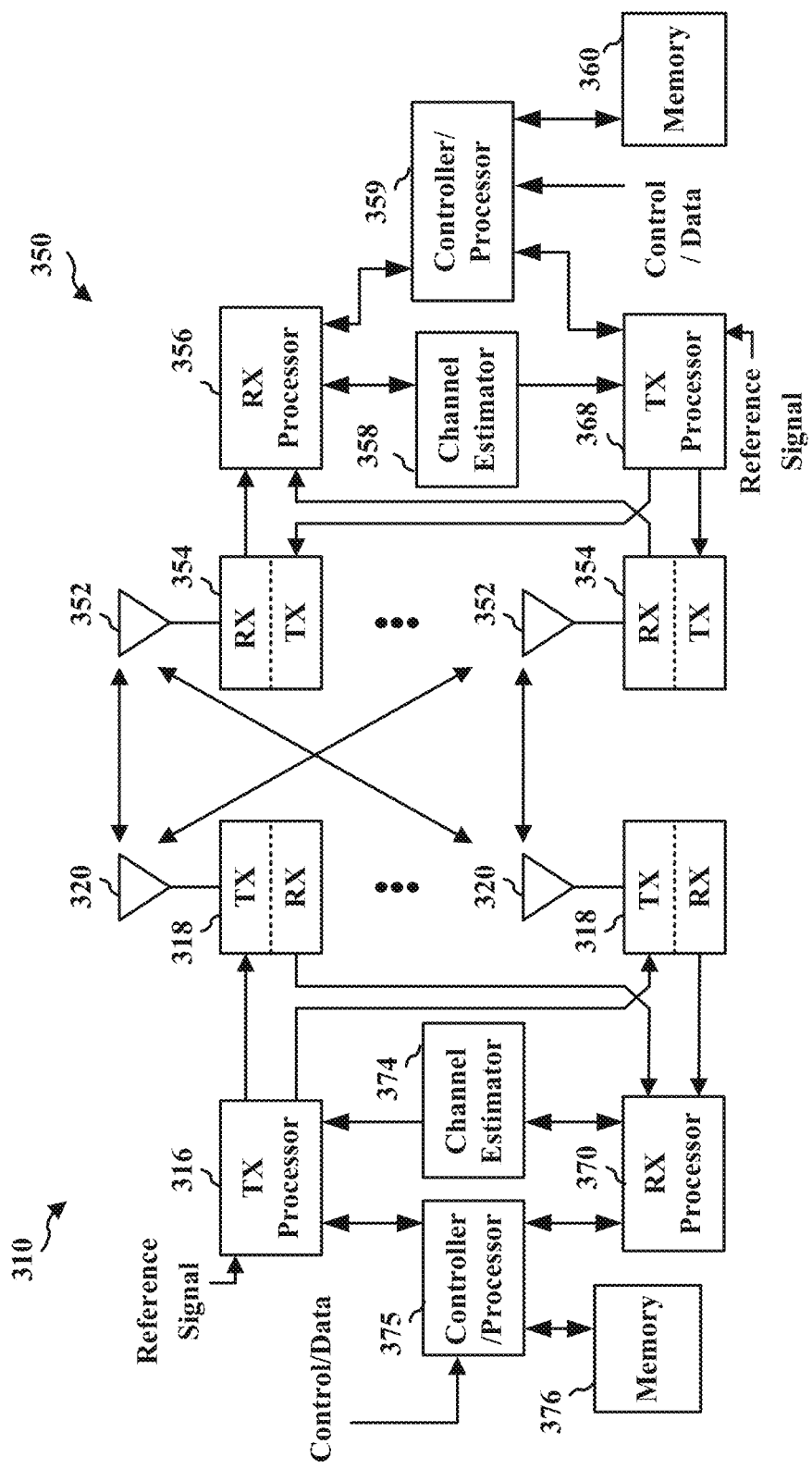
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

One way to meet the increasing demand for mobile broadband may be to utilize the mmW spectrum in addition to LTE. An mmW communication system may operate at very high frequency bands (e.g., 10.0 GHz to 300.0 GHz) where the carrier wavelength is on the order of a few millimeters. An mmW system may operate with the help of a number of antennas and beamforming to overcome a channel having low gain. For example, heavy attenuation at high carrier frequency bands may limit the range of a transmitted signal to a few tens of meters (e.g., 1 to 50 meters). Also, the presence of obstacles (e.g., walls, furniture, people, etc.) may block the propagation of high frequency millimeter waves. As such, propagation characteristics of high carrier frequencies necessitate the need for directional beamforming between the mmW base station and the UE that focuses the transmit energy in specific spatial directions corresponding to the dominant spatial scatterers, reflectors, and/or diffraction paths to overcome the loss. Beamforming may be implemented via an array of antennas (e.g., phased arrays) cooperating to beamform a high frequency signal in a particular direction to receiving devices, and therefore, extend the range of the signal.

During beamforming, a UE may estimate channel characteristics associated with one or more potential access beams and transmit information associated with the estimated channel characteristics to an mmW base station. For example, the channel characteristics of at least one beam reference signal (BRS) and/or at least one beam refinement reference signal (BRRS) associated with each of the potential access beams may be estimated by the UE. Using the information associated with the estimated channel characteristics for each of the potential access beams, the mmW base station may select an access beam with the most desirable channel characteristics and adjust a phase shift of each of the antennas ports used for transmitting the channel such that the channel is spatially focused in the direction of the first device. A spatially focused channel may have a better SNR (e.g., level of a desired signal compared to the level of background noise) than a channel that is not spatially focused. Transmitting a channel with a better SNR (e.g., as compared to a channel with a worse SNR) may increase the data rate that may be received at the first device.

Figure 4A:
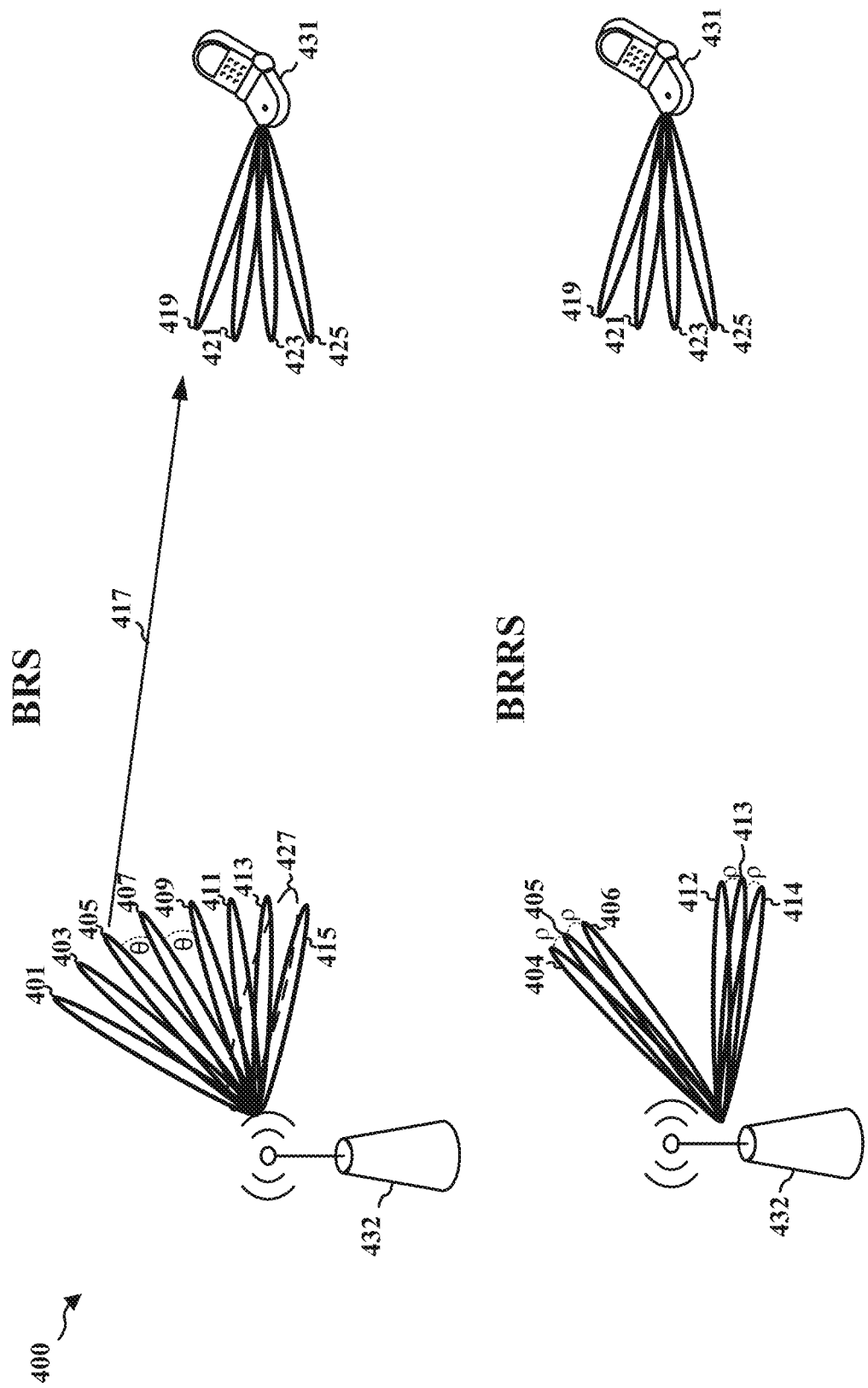
FIG. 4A is a diagram of an mmW communication system that may enable a synchronization and beam tracking procedure in accordance with certain aspects of the disclosure.

FIG. 4A is a diagram illustrating an example of an mmW communication system 400 that may perform beamforming. The mmW communication system 400 includes UE 431 and mmW base station 432. In an aspect, the UE 431 and mmW base station 432 may perform initial synchronization and discovery to establish an access link that may be used for mmW communications. For example, the UE 431 and the mmW base station 432 may establish an access link along path 417. During initial synchronization, mmW base station 432 may transmit a signal (e.g., a beam reference signal (BRS)) in a first set of beams (e.g., beams 401, 403, 405, 407) during a first symbol of a synchronization subframe and transmit the same signal in a second set of beams (e.g., beams 409, 411, 413, 415) during a second symbol of the synchronization subframe that is received at UE 431.

In a first aspect, the first set of beams may include beams 401, 403, 405, 407 and the second set of beams 409, 411, 413, 415. In one aspect, the first set of beams may be non-adjacent beams selected from a first group of beams as discussed infra with respect to FIG. 4B. In another aspect, the second set of beams may be non-adjacent beams selected from a second group of beams as discussed infra with respect to FIG. 4C. By selecting non-adjacent beams, the mmW base station 432 may sweep through "coarse" beam directions to estimate an L number of directions (also referred to as beamforming directions or angles) corresponding to L beam paths without having to sweep through all of the potential beams during synchronization.

Figure 4D:
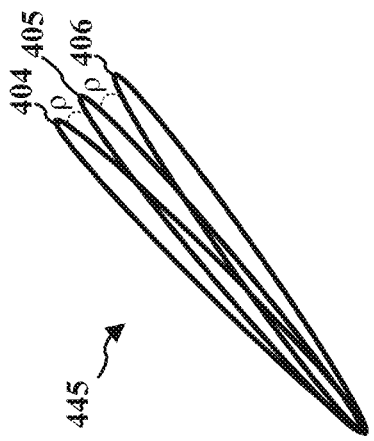
FIG. 4D is a diagram of a first set of fine beams that may be used in accordance with certain aspects of the disclosure.
Figure 4E:
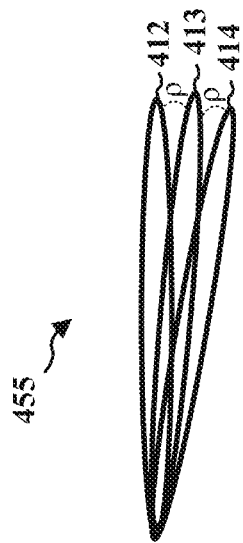
FIG. 4E is a diagram of a second set of fine beams that may be used in accordance with certain aspects of the disclosure.
Figure 4B:
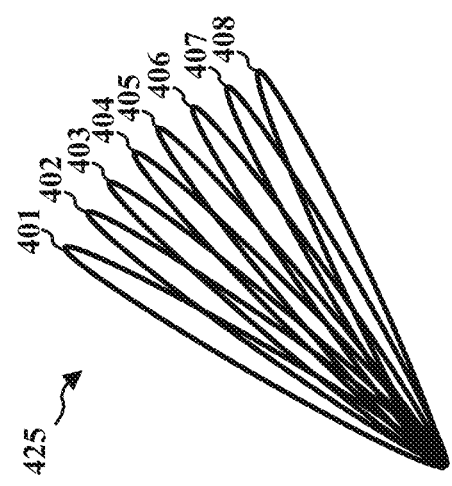
FIG. 4B is a diagram of a first group of beams that may be used in accordance with certain aspects of the disclosure.

FIG. 4B illustrates a first group of fine beams 425 that are separated by angles smaller than θ. The group of beams 425 illustrated in FIG. 4B contain eight different beams that are spatially focused in different directions. For example, the group of beams 425 includes $beam_1$ 401 that is spatially focused in a first direction, $beam_2$ 402 that is spatially focused in a second direction, $beam_3$ 403 that is spatially focused in a third direction, $beam_4$ 404 that is spatially focused in a fourth direction, $beam_5$ 405 that is spatially focused in a fifth direct, $beam_6$ 406 that is spatially focused in a sixth direction, $beam_7$ 407 that is spatially focused in a seventh direction, and $beam_8$ 408 that is spatially focused in an eighth direction. The number of beams illustrated in FIG. 4B is meant to be illustrative, and one of ordinary skill understands that more or fewer beams may be included in the first group of beams without departing from the scope of the present disclosure.

Figure 4C:
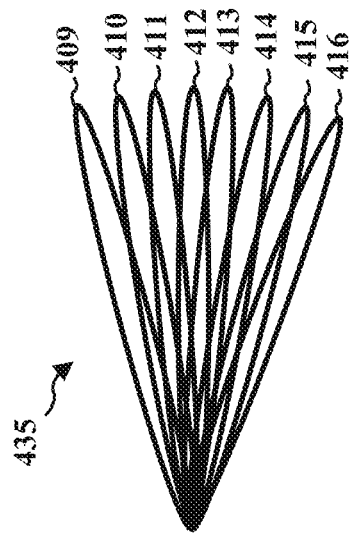
FIG. 4C is a diagram of a second group of beams that may be used in accordance with certain aspects of the disclosure.

FIG. 4C illustrates a second group of fine beams 435 that are separated by angles smaller than θ. The group of beams 435 illustrated in FIG. 4C contain eight different beams that are spatially focused in different directions. For example, the group of beams 435 includes $beam_9$ 409 that is spatially focused in a ninth direction, $beam_{10}$ 410 that is spatially focused in a tenth direction, $beam_{11}$ 411 that is spatially focused in an eleventh direction, $beam_{12}$ 412 that is spatially focused in a twelfth direction, $beam_{13}$ 413 that is spatially focused in a thirteenth direct, $beam_{14}$ 414 that is spatially focused in a fourteenth direction, $beam_{15}$ 415 that is spatially focused in a fifteenth direction, and $beam_{16}$ 416 that is spatially focused in a sixteenth direction. The number of beams illustrated in FIG. 4C is meant to be illustrative, and one of ordinary skill understands that more or fewer beams may be included in the second group of beams without departing from the scope of the present disclosure.

Referring again to FIG. 4A, UE 431 may determine a strongest beam (e.g., $beam_n$) in the first set of beams and a strongest beam (e.g., $beam_v$) in the second set of beams. For example, $beam_n$ may be $beam_5$ 405 and $beam_v$ may be $beam_{13}$ 413. In the particular example illustrated in FIG. 4A, n=5 and v=13. However, the values n and v are not limited to those illustrated in FIG. 4A.

After performing the initial synchronization and discovery using the first set of beams and the second set of beams, the UE 431 and the mmW base station 432 may each have an estimate of an L number of directions (also referred to as beamforming directions or angles) corresponding to L beam paths (e.g., 401, 403, 405, 407, 409, 411, 413, 415) from the mmW base station 432 to the UE 431. In an aspect, L may be an integer greater than 1 (for diversity reasons). In an aspect, the mmW base station 432 and/or the UE 431 may have an estimate of the relative strength of these L beam paths allowing initial beamforming to be performed on the beam path(s) with the most desirable channel characteristics (e.g., the strongest beam in the first set and the strongest beam in the second set).

In an aspect, UE 431 may transmit information associated with the strongest beam in the first set of beams (e.g., $beam_5$ 405) and the strongest beam in the second set of beams (e.g., $beam_{13}$ 413) to the mmW base station 432. For example, the information may include one or more channel characteristics and/or estimates associated with at least $beam_5$ 405 and $beam_{13}$ 413.

In an aspect, the beamforming capability may be an analog beamforming capability. For example, the mmW base station 432 may have analog beamforming capability that may allow the mmW base station 432 to transmit a single beam (e.g., beams 405 along path 417) through one available RF chain at a time. The term RF chain refers to a combination of power amplifier, digital to analog converter, and a mixer when referring to the transmit side of a modem or to a combination of a low noise amplifier, demixer, and an analog to digital converter when referring to the receiver side of a modem. In an aspect, the beamforming capability may be a digital beamforming capability. For example, the mmW base station 432 may have digital beamforming capability, corresponding to the same number of RF chains as the number of antennas, that may allow the mmW base station 432 to concurrently transmit multiple beams (e.g., one or more of beams 401, 403, 405, 407, 409, 411, 413, or 415) by emitting electromagnetic energy in multiple directions at the expense of peak gain. In an aspect, the beamforming capability may be a hybrid beamforming capability with the number of RF chains being more than one and less than the number of antennas. For example, the mmW base station 432 may have hybrid beamforming capability that may allow the mmW base station 432 to transmit a beam from each of the RF chains of the mmW base station 432. In an aspect, the beamforming capability may be an availability of multiple antenna sub-arrays. For example, the UE 431 may have multiple antenna subarrays that allow the UE 431 to transmit beams from each of the antenna sub-arrays in different directions (e.g., the respective directions of beams 419, 421, 423, 425) to overcome RF obstructions, such as a hand of the user of the UE 431 inadvertently blocking a path of a beam.

In another aspect, the beamforming capability may be that one device in the mmW communication system 400 has a higher antenna switching speed than another device in the mmW communication system 400. For example, the mmW base station 432 may have a higher antenna switching speed than the UE 431. In such example, the higher antenna switching speed of the mmW base station 432 may be leveraged by configuring the mmW base station 432 to scan different directions and/or sectors while the UE 431 transmits a beam in a fixed direction. In another example, the UE 431 may have a higher antenna switching speed than the mmW base station 432. In such example, the higher antenna switching speed of the UE 431 may be leveraged by configuring the UE 431 to scan different directions and/or sectors while the mmW base station 432 transmits a beam in a fixed direction.

After an initial synchronization and discovery phase, beam tracking may be performed by the UE 431 and/or the mmW base station 432 by transmitting a signal (e.g., BRRS) using fine beam angles ρ (e.g., angles within a narrow range), where an initial estimate of the channel characteristics associated with beams separated by the course beam angles θ (e.g., angles within a broad range) has already been obtained by the UE 431 and/or the mmW base station 432. Beam tracking algorithms typically use the course beam angles (e.g., θ) learned in the initial synchronization and discovery period as an initial value (also referred to as a seed value) and to subsequently fine tune these angles within a narrow range over a period of time in which the dynamic range of the angles is smaller than θ. For example, ρ may be less than θ.

For example, UE 431 may receive a third set of beams associated with a BRRS and a fourth set of beams associated with the BRRS from the second device. In an aspect, the third set of beams may include the beams 405 (e.g., the strongest beam in the first set of beams) and at least one beam adjacent to the beam$_5$ 405, and the fourth set of beams may include beam$_{13}$ 413 and at least one beam adjacent to beam$_{13}$ 413. In one aspect, the third set of beams may be adjacent beams selected from the first group of beams (e.g., as seen in FIG. 4B) as discussed infra with respect to FIG. 4D. In a further aspect, the fourth set of beams may be adjacent beams selected from the second group of beams (e.g., as seen in FIG. 4C) as discussed infra with respect to FIG. 4E.

FIG. 4D illustrates a set of fine beams 445 that may be separated by the angle ρ, wherein ρ is less than θ. The group of beams 445 illustrated in FIG. 4D contains beams 405 and adjacent beams beam$_4$ 404 and beam$_6$ 406. The number of beams illustrated in FIG. 4D is meant to be illustrative, and one of ordinary skill understands that more or fewer beams may be included in the group of beams without departing from the scope of the present disclosure.

FIG. 4E illustrates a set of fine beams 455 that are separated by the angle ρ, wherein ρ is less than θ. The group of beams 455 illustrated in FIG. 4E contains beam$_{13}$ 413 and adjacent beams beam$_{12}$ 412 and beam$_{14}$ 414. The number of beams illustrated in FIG. 4E is meant to be illustrative, and one of ordinary skill understands that more or fewer beams may be included in the group of beams without departing from the scope of the present disclosure.

Referring again to FIG. 4A, UE 431 may determine a strongest beam (e.g., beam$_{n+a}$) in the third set of beams (e.g., beams 404, 405, 406) and a strongest beam (e.g., beam$_{v+b}$) in the fourth set of beams (e.g., beams 412, 413, 414). For example, the strongest beam in the third set of beams may be beam$_6$ 406 (e.g., beam$_{n+a}$, where n=5 and a=1 in FIG. 4A) and the strongest beam in the fourth set of beams may be beam$_{12}$ 412 (e.g., beam$_{v+b}$, where v=13 and b=−1 in FIG. 4A). In the particular example illustrated in FIG. 4A, n=5, v=13, a=1, and b=−1. However, the values n, v, a, and b are not limited to those illustrated in FIG. 4A. For example, the strongest beam in the third set of beams (e.g., beam$_{n+a}$) may not be directly adjacent to the strong beam in the first set of beams (e.g., beam$_n$) in which case a may be an integer value greater than 1 or an integer value less than −1. Similarly, the strongest beam in the fourth set of beams (e.g., beam$_{v+b}$) may not be directly adjacent to the strong beam in the second set of beams (e.g., beam$_v$) in which case b may be an integer value greater than 1 or an integer value less than −1.

In an aspect, UE 431 may transmit information associated with the strongest beams in the third set of beams and the fourth set of beams to the mmW base station 432. In one aspect, the information may be indicated by two bits in a message transmitted to the mmW base station 432.

Due to the potentially large number of antenna ports at an mmW base station and antenna subarrays at a UE the number of possible beams (e.g., beams with different beam angles) that may need to be scanned during beam tracking may be quite large (e.g., a much larger number than the illustrated in the example described with respect to FIG. 4A) especially when a control channel and an associated data channel are transmitted using different beams. Beam tracking a large number of potential channels may take an undesirable amount of time and create significant beam overhead. There is a need for a beam tracking technique that reduces the time needed to perform a beamforming procedure and that reduces beam overhead.

The present disclosure provides a solution to the problem by providing a relationship between the control channel beam and the associated data channel beam in order to reduce the time needed to complete beam tracking. In a first aspect, the control channel beam and the associated data channel beam may be correlated via an explicit mapping or an implicit mapping of the different beams. In a second aspect, the relationship between the control channel beam and the associated data channel beam may be independent without an explicit or implicit mapping. In the second aspect, the control channel beam and the associated data channel beam may be selected without a correlation. By providing a relationship between the control channel beam and the associated data channel beam, the present disclosure may reduce the time needed to complete beam tracking and reduce the beam overhead of the system by decreasing the number of potential beams that may need to be scanned since the UE 431 and/or mmW base station 432 may only need to determine an access beam for one of the control channel or the data channel.

Figure 4F:
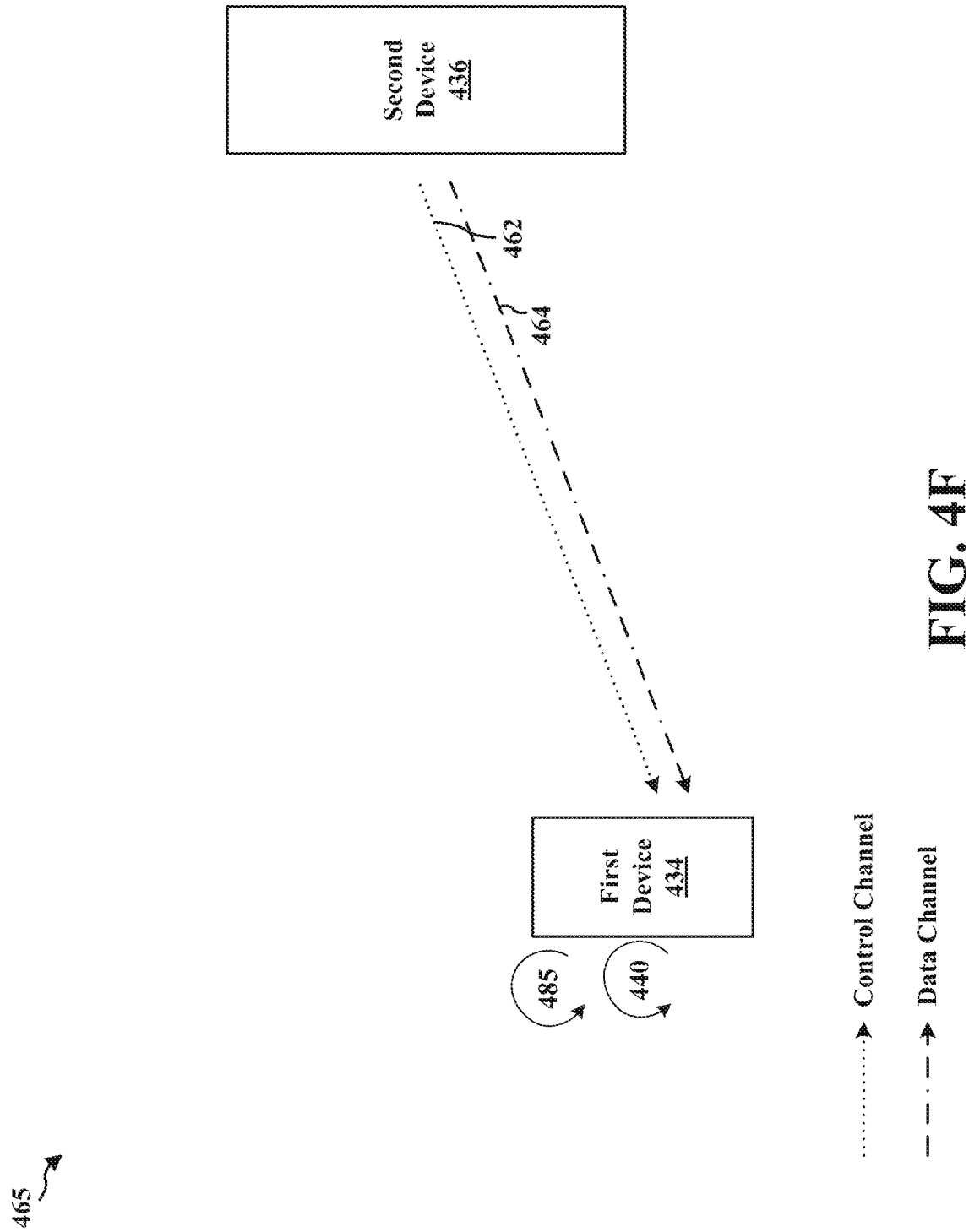
FIG. 4F is a diagram of an mmW communication system that may provide a relationship between a control channel beam and a data channel beam in accordance with certain aspects of the disclosure.

FIG. 4F is a diagram of the mmW communication system 465 that may enable a reduction in the time needed to complete beam tracking and a reduction in beam overhead by providing a relationship between a first beam used for communicating a control channel and a second beam used for communicating an associated data channel. For example, the beam tracking procedure described with respect to FIG. 4F may be performed with an explicit or an implicit knowledge of a relationship between the control channel beam and the data channel beam in order to decrease the time needed to complete beamforming. In one aspect, the relationship may be a correlation between the control channel beam and the data channel beam. In another configuration, the relationship between the control channel beam and the data channel beam may be an independent relationship (e.g., no apparent correlation between the control channel beam and the data channel beam). In the second configuration, the relationship may be specifically indicated via signaling.

Referring to FIG. 4F, the wireless communication system 465 may include, for example, a first device 434 and a second device 436 that perform beam tracking 485 (e.g., as described supra with respect to FIG. 4A) to determine a first beam used for a first type of channel (e.g., control channel or data channel). The second beam used for the second type of channel (e.g., control channel or data channel) may be determined based on a relationship with the first beam. In one aspect, the first beam and the second beam may be different. In another aspect, the first beam and the second beam may be the same beam. In further aspect, the first channel type and the second channel type may be different.

In one configuration, the first device 434 may be the UE 431 seen in FIG. 4A and the second device 436 may be the mmW base station 432 seen in FIG. 4A. In another configuration, the first device 434 may be the mmW base station 432 seen in FIG. 4A and the second device 436 may be the UE 431 seen in FIG. 4A.

First Example Embodiment

In a first example embodiment, first device 434 may determine a mapping between the first beam and the second beam by determining 440 that the first beam and the second beam differ in width by a first amount. In one configuration, the first device 434 may know a priori the difference in width. In another configuration, the first device 434 may receive an indication that the first beam and the second beam differ in width by the fixed amount.

Based on the beam tracking procedure described supra with respect to FIG. 4A, the first device 434 and/or the second device 436 may determine, for example, that beam$_{13}$ 413 has the most desirable channel characteristics and will be used as the beam used for transmitting one of the control channel or the data channel. The first device 434 may determine that beam$_{13}$ 413 and beam 427 (e.g., as seen in FIG. 4A) differ in width by the fixed amount, and thus select beam 427 for transmitting the other one of the control channel or the data channel.

Second Example Embodiment

In a second example embodiment, first device 434 may determine the mapping by determining 440 that the first beam and the second beam are the same beam. In one configuration, the first device 434 may know a priori that the same beam will be used for the first beam and the second beam. Optionally, the first device 434 may receive an indication that the same beam will be used for transmitting the control channel and the data channel.

For example, one of the beams 401, 403, 405, 407, 409, 411, 413, 415 that were used for transmitting BRS in FIG. 4A may be used for the control channel and the data channel, or one of the beams 404, 405, 406, 412, 413, 414 that were used for transmitting BRRS in FIG. 4A may be used for the control channel and the data channel.

Third Example Embodiment

In a third example embodiment, first device 434 may determine the mapping by determining 440 that a first subarray associated with the first beam is quasi co-located with a second subarray associated with the second beam.

Based on the beam tracking procedure described supra with respect to FIG. 4A, the first device 434 and/or the second device 436 may determine, for example, that beam$_{13}$ 413 has the most desirable channel characteristics and will be used for either the control channel 462 or the data channel 464. The first device 434 may determine that the subarray (e.g., antenna subarray if first device 434 is a UE and antenna ports if first device 434 is an mmW base station) used for receiving beam$_{13}$ 413 is quasi co-located with the subarray used for receiving beam$_{27}$ 427, and thus select beam$_{27}$ 427 for the other one of the control channel 462 or the data channel 464.

When two subarrays are quasi co-located, the large-scale properties of the channel over which a symbol on one antenna port is conveyed can be inferred from the channel over which a symbol on the other antenna port is conveyed. For example, the large-scale properties may include one or more of delay spread, Doppler spread, Doppler shift, average gain, and average delay.

Fourth Example Embodiment

In a fourth example embodiment, first device 434 may determine the mapping by correlating 440 one of the BRS beams used as either the control channel 462 or the data channel 464 with one of the BRRS beams used as the other one of the control channel 462 or the data channel.

For example, beam$_n$ (e.g., beam$_5$ in FIG. 4A) may be correlated with beam$_{n+a}$ (e.g., beam$_6$ in FIG. 4A) and beam$_v$ (e.g., beam$_{13}$ in FIG. 4A) may be correlated with beam$_{v+b}$ (e.g., beam$_{12}$ in FIG. 4A), where beam, and beam$_{n+a}$ are both used to transmit the BRS, and beam$_v$ and beam$_{v+b}$ are both used to transmit the BRRS.

Optionally, the first device 434 may receive, from the second device 436, an indication that the beam$_n$ is correlated with the beam$_{n+a}$ and/or beam$_v$ is correlated with the beam$_{v+b}$. In one aspect, the indication may be received via control channel (e.g., PDCCH) signaling or RRC signaling. Additionally, the first device 434 may receive, from the second device 436, information indicating that beam$_n$ (e.g., or beam$_v$) will be used for either the control channel 462 or the data channel 464.

In a first configuration, the first device 434 may determine 440 that beam$_{n+a}$ (e.g., beam$_6$ 406 in FIG. 4A) may be used for either the control channel 462 or the data channel 464 when the beam$_n$ (e.g., beam$_5$ 405 in FIG. 4A) is used for the other one of the control channel 462 or the data channel 464. Alternatively, in the first configuration, the first device 434 may determine that beam$_{v+b}$ (e.g., beam$_{12}$ 412 in FIG. 4A) may be used for either the control channel 462 or the data channel 464 when the beam$_v$ (e.g., beam$_{13}$ 413 in FIG. 4A) is used as the other one of the control channel 462 or the data channel 464.

In a second configuration, the first device 434 may determine 440 that beam$_n$ (e.g., beam$_5$ 405 in FIG. 4A) may be used for either the control channel 462 or the data channel 464 when the beam$_{n+a}$ (e.g., beam$_6$ 406 in FIG. 4A) is used as the other one of the control channel 462 or the data channel 464. Alternatively, in the second configuration, the first device 434 may determine 440 that beam$_v$ (e.g., beam$_{13}$ 413 in FIG. 4A) may be used for either the control channel 462 or the data channel 464 when the beam$_{v+b}$ (e.g., beam$_{12}$ 412 in FIG. 4A) is used as the other one of the control channel 462 or the data channel 464.

Additionally and/or alternatively, first device 434 may receive information from the second device 436 indicating that beam$_n$ will be used for either the control channel 462 or the data channel and/or beam$_v$ will be used for the control channel 462 or data channel 464.

Fifth Example Embodiment

In a fifth example embodiment, first device 434 may determine the mapping by correlating 440 one of the BRS beams used as the control channel with another one of the BRS beams used as the data channel. Additionally and/or alternatively, first device 434 may determine the mapping by correlating 440 one of the BRRS beams used as the control channel with another one of the BRRS beams used as the data channel.

For example, beam$_n$ (e.g., beam$_5$ 405 in FIG. 4A) may be correlated with beam$_v$ (e.g., beam1$_3$ 413 in FIG. 4A) and beam$_{n+a}$ (e.g., beam$_6$ 406 in FIG. 4A) may be correlated with beam$_{v+b}$ (e.g., beam$_{12}$ 412 in FIG. 4A). For example, beam$_n$ and beam$_v$ may both used to transmit the BRS and beam$_{n+a}$ and beam$_{v+b}$ are both used to transmit the BRRS.

In one configuration, the first device 434 may determine that beam$_v$ will be used as either the control channel 462 or the data channel 464 when beam$_n$ is used the other one of the control channel 462 or the data channel 464. Alternatively, the first device 434 may determine that beam$_{v+b}$ will be used as either the control channel 462 or the data channel 464 when beam$_{n+a}$ is used the other one of the control channel 462 or the data channel 464.

Sixth Example Embodiment

In a sixth example embodiment, the first device 434 may determine the mapping by determining that beam$_x$ will be used as the first beam and that beam$_z$ will be used as the second beam. For example, the first device 434 may receive, from the second device, 436 information indicating that beam$_x$ will be used as the first beam and that beam$_z$ will be used as the second beam. Beam$_x$ and beam$_z$ may not be correlated in any obvious manner, and thus the mapping in the sixth example embodiment may be an independent relationship determined by the second device 436.

After determining 440 the relationship between the first beam and the second beam based on one example embodiments discussed supra, the first device 434 may receive the control channel 462 and the data channel 464.

By providing the relationship between the control channel beam and the associated data channel beam as described supra with respect to the first, second, third, fourth, fifth, and sixth example embodiments, the present disclosure may reduce the time needed to complete beam tracking and reduce the beam overhead of the system by decreasing the number of potential beams that may need to be scanned since the UE and/or mmW may only need to determine an access beam for one of the control channel or the data channel.

Figure 5A:
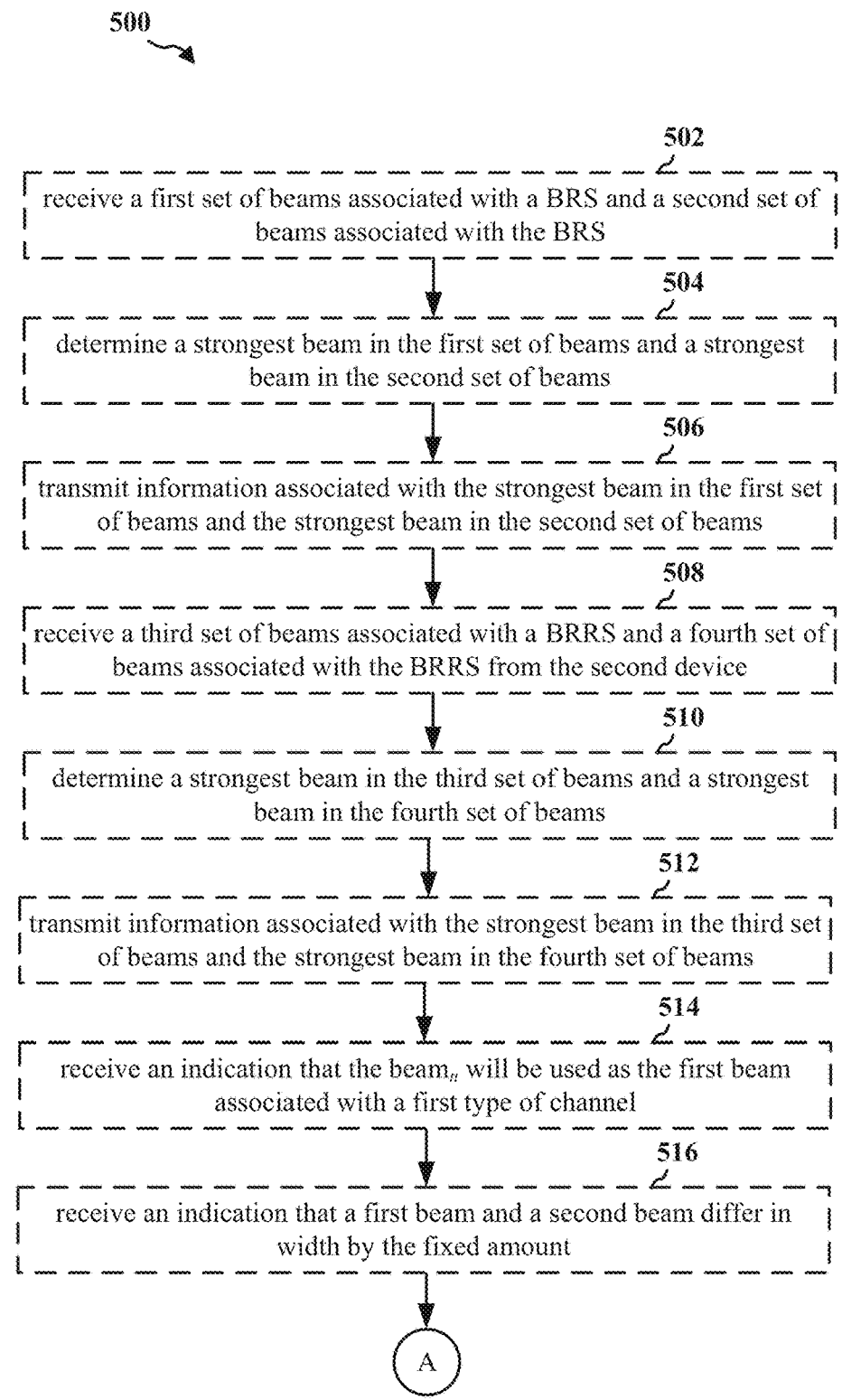
FIGS. 5A-5C are a flowchart of a method of wireless communication.
Figure 5B:
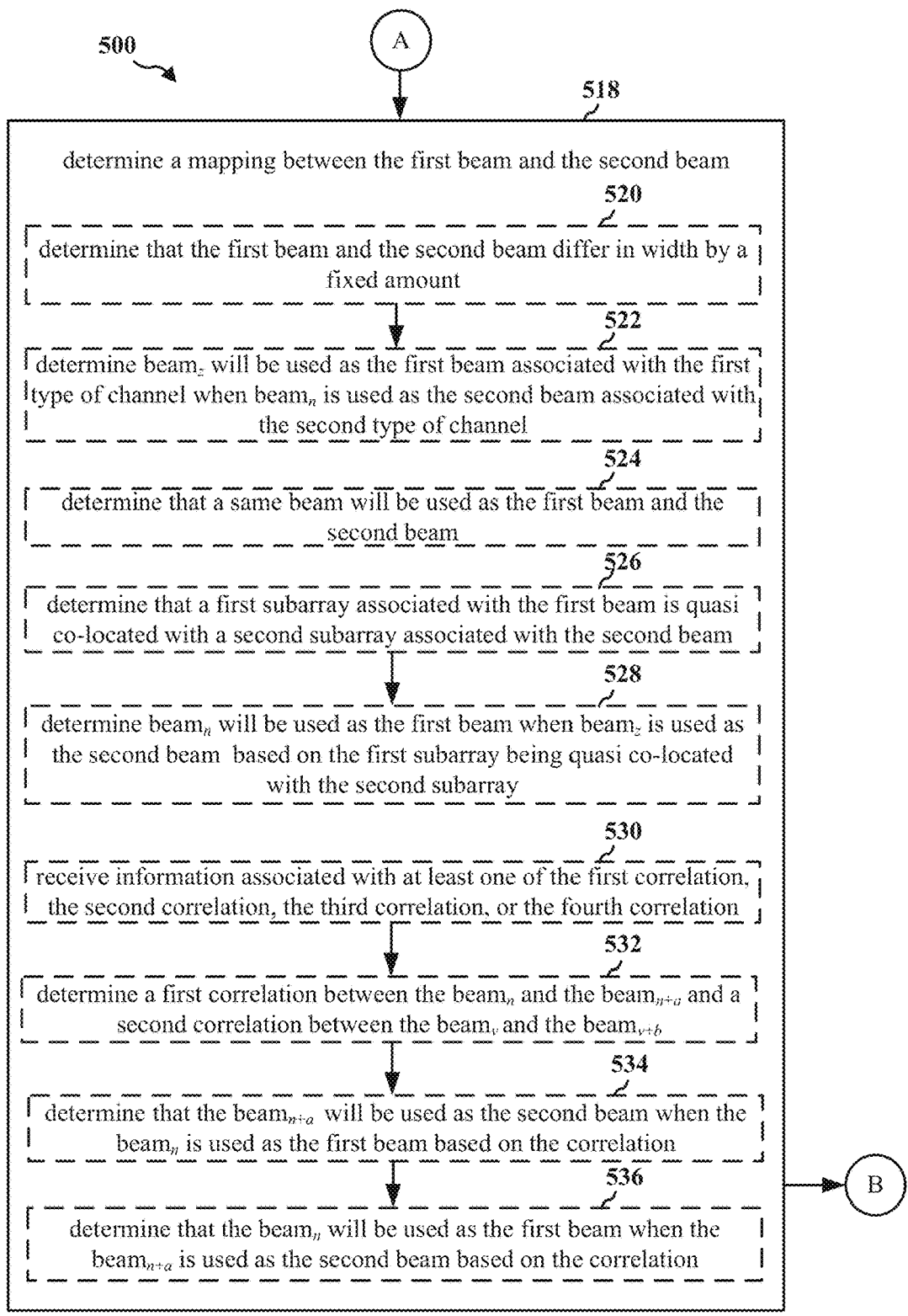
Figure 5C:
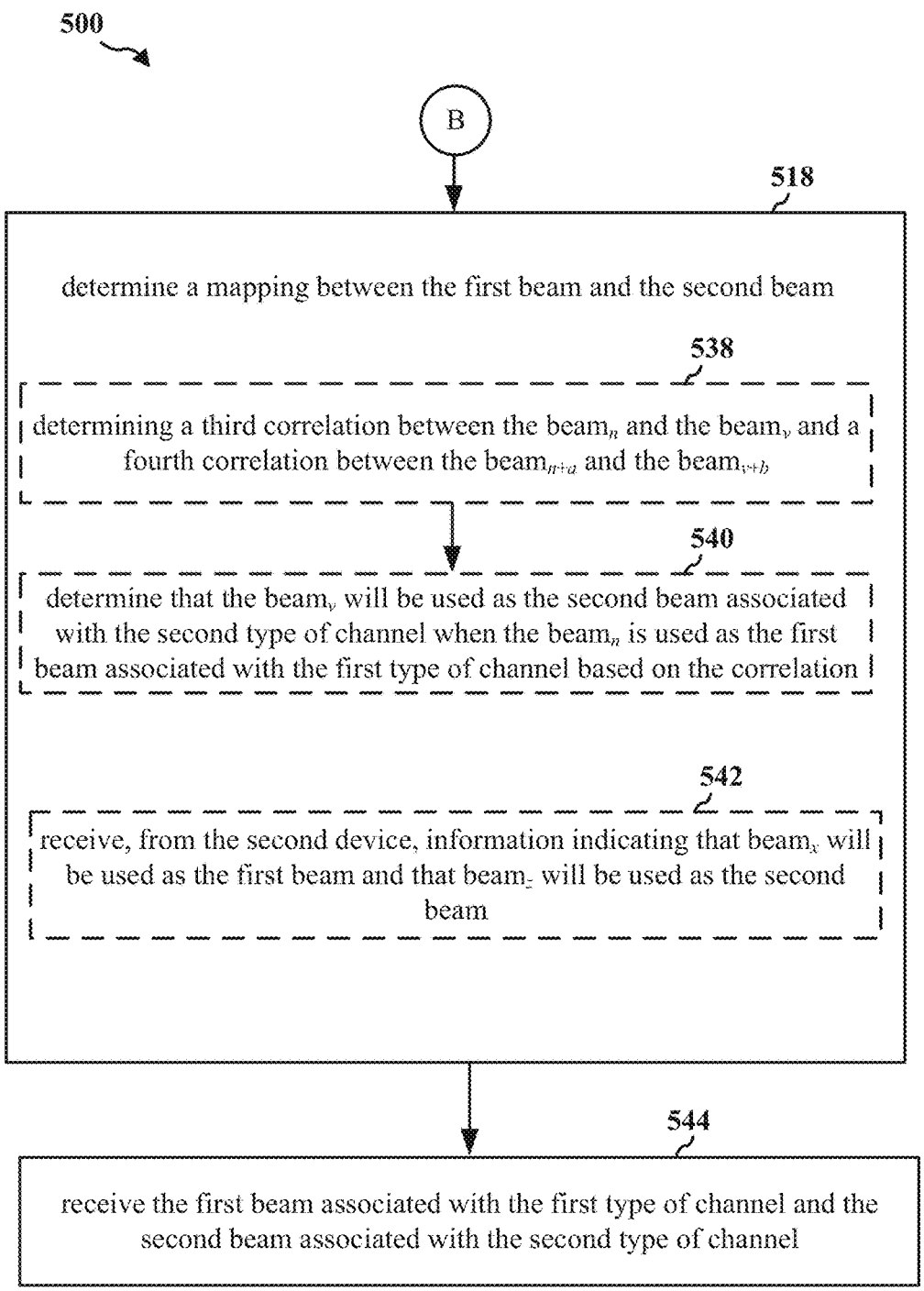

FIGS. 5A-5C are a flowchart 500 of a method of wireless communication. The method may be performed by a first device (e.g., the UE 431, mmW base station 432, first device 434, the apparatus 602/602'). In FIGS. 5A-5C, operations indicated with dashed lines represent optional operations for various aspects of the disclosure.

Referring to FIG. 5A, at 502, the first device may receive a first set of beams associated with a BRS and a second set of beams associated with the BRS. In an aspect, the first set of beams may be different than the second set of beams. For example, referring to FIG. 4A, during initial synchronization, UE 431 may receive a signal (e.g., a BRS) in a first set of beams (e.g., beams 401, 403, 405, 407) during a first symbol of a synchronization subframe and transmit the same signal in a second set of beams (e.g., beams 409, 411, 413, 415) during a second symbol of the synchronization subframe.

At 504, the first device may determine a strongest beam in the first set of beams and a strongest beam in the second set of beams. In one aspect, the strongest beam in the first set of beams may be beam$_n$ and the strongest beam in the second set of beams may be beam$_v$. For example, referring to FIG. 4A, UE 431 may determine a strongest beam (e.g., beam$_n$) in the first set of beams and a strongest beam (e.g., beam$_v$) in the second set of beams. For example, beam$_n$ may be beam$_5$ 405 and beam$_v$ may be beam$_{13}$ 413. In the particular example illustrated in FIG. 4A, n=5 and v=13. However, the values n and v are not limited to those illustrated in FIG. 4A.

At 506, the first device may transmit information associated with the strongest beam in the first set of beams and the strongest beam in the second set of beams to the second device. For example, referring to FIG. 4A, UE 431 may transmit information associated with the strongest beam in the first set of beams (e.g., beam$_5$ 405) and the strongest beam in the second set of beams (e.g., beam$_{13}$ 413) to the mmW base station 432. For example, the information may include one or more channel characteristics and/or estimates associated with at least beam$_5$ 405 and beam$_{13}$ 413.

At 508, the first device may receive a third set of beams associated with a BRRS and a fourth set of beams associated with the BRRS from the second device. In one aspect, the third set of beams may include the beam$_n$ and at least one beam adjacent to the beam$_n$, and the fourth set of beams may include the beam$_v$ and at least one beam adjacent to the beam$_v$. For example, referring to FIG. 4A, UE 431 may receive a third set of beams associated with a BRRS and a fourth set of beams associated with the BRRS from the second device. In an aspect, the third set of beams may include the beam$_5$ 405 (e.g., beam$_n$) and at least one beam adjacent to the beam$_5$ 405, and the fourth set of beams may include beam$_{13}$ 413 (e.g., beam$_v$) and at least one beam adjacent to beam$_{13}$ 413. In one aspect, the third set of beams (e.g., discussed supra with respect to FIG. 4D) may be adjacent beams selected from the first group of beams in FIG. 4B In a further aspect, the fourth set of beams (e.g., discussed supra with respect to FIG. 4E) may be adjacent beams selected from the second group of beams in FIG. 4C.

At 510, the first device may determine a strongest beam in the third set of beams and a strongest beam in the fourth set of beams. In an aspect, the strongest beam in the third set of beams may be beams$_{n+a}$ and the strongest beam in the fourth set of beams may be beam$_{v+b}$. For example, referring to FIG. 4A, UE 431 may determine a strongest beam (e.g., beam$_{n+a}$) in the third set of beams (e.g., beams 404, 405, 406) and a strongest beam (e.g., beam$_{v+b}$) in the fourth set of beams (e.g., beams 412, 413, 414). For example, the strongest beam in the third set of beams may be beam$_6$ 406 (e.g., beam$_{n+a}$, where n=5 and a=1 in FIG. 4A) and the strongest beam in the fourth set of beams may be beam$_{12}$ 412 (e.g., beam$^{v+b}$, where v=13 and b=−1 in FIG. 4A). In the particular example illustrated in FIG. 4A, n=5, v=13, a=1, and b=−1. However, the values n, v, a, and b are not limited to those illustrated in FIG. 4A. For example, the strongest beam in the third set of beams (e.g., beam$_{n+a}$) may not be directly adjacent to the strong beam in the first set of beams (e.g., beam$_n$) in which case a may be an integer value greater than 1 or an integer value less than −1. Similarly, the strongest beam in the fourth set of beams (e.g., beam$_{v-b}$) may not be directly adjacent to the strong beam in the second set of beams (e.g., beam$_v$) in which case b may be an integer value greater than 1 or an integer value less than −1.

At 512, the first device may transmit information associated with the strongest beam in the third set of beams and the strongest beam in the fourth set of beams to the second device. For example, referring to FIG. 4A, UE 431 may transmit information associated with the strongest beams in the third set of beams and the fourth set of beams to the mmW base station 432. In one aspect, the information may be indicated by two bits in a message transmitted to the mmW base station 432.

At 514, the first device may receive, from the second device, information indicating that either beam$_n$ or beam$_v$ will be used as the first beam associated with the first type of channel. For example, referring to FIG. 4F, the first device 434 may receive, from the second device 436, information indicating that beam$_n$ (e.g., or beam$_v$) will be used for the control channel 462 or the data channel 464.

At 516, the first device may receive, from the second device, an indication that the first beam and the second beam differ in width by the fixed amount. For example, referring to FIG. 4F, the first device 434 may receive an indication that the first beam and the second beam differ in width by the fixed amount.

Referring to FIG. 5B, at 518, the first device may determine a mapping between a first beam associated with a first type of channel and a second beam associated with a second type of channel. In one aspect, the first type of channel may be different than the second type of channel. For example, the first type of channel may be a control channel and the second type of channel may be a data channel, or vice versa. Referring to FIG. 4F, a first device 434 and/or a second device 436 may perform beam tracking 485 (e.g., as described supra with respect to FIG. 4A) to determine a first beam used for a first type of channel (e.g., control channel or data channel) and/or a second beam used for a second type of channel (e.g., control channel or data channel). The second beam used for the second type of channel may be determined based on a relationship with the first beam. In one aspect, the first beam and the second beam may be different. In another aspect, the first beam and the second beam may be the same beam. In further aspect, the first channel type and the second channel type may be different. For example, the first channel type may be a control channel and the second channel type may be an associated data channel, or vice versa.

First Example Embodiment

At 520, the first device may determine the mapping by determining that the first beam and the second beam differ in width by a fixed amount. For example, referring to FIG. 4F, first device 434 may determine a mapping between the first beam and the second beam by determining 440 that the first beam and the second beam differ in width by a first amount. In one configuration, the first device 434 may know a priori the difference in width. In another configuration, the first device 434 may receive an indication that the first beam and the second beam differ in width by the fixed amount. Based on the beam tracking procedure described supra with respect to FIG. 4A, the first device 434 and/or the second device 436 may determine, for example, that $beam_{13}$ 413 has the most desirable channel characteristics and will be used as the beam used for transmitting one of the control channel or the data channel. The first device 434 may determine that $beam_{13}$ 413 and $beam_{27}$ 427 (e.g., as seen in FIG. 4A) differ in width by the fixed amount, and thus select $beam_{27}$ 427 for transmitting the other one of the control channel or the data channel.

At 522, the first device may determine the mapping by determining $beam_z$ will be used as the first beam associated with the first type of channel when $beam_n$ is used as the second beam associated with the second type of channel. In an aspect, the $beam_z$ and the $beam_n$ may differ in width by the fixed amount. For example, referring to FIGS. 4A and 4F, based on the beam tracking procedure, the first device 434 and/or the second device 436 may determine, for example, that $beam_{13}$ 413 has the most desirable channel characteristics and will be used as the beam used for transmitting one of the control channel or the data channel. The first device 434 may determine that $beam_{13}$ 413 and $beam_{27}$ 427 (e.g., as seen in FIG. 4A) differ in width by the fixed amount, and thus select $beam_{27}$ 427 for transmitting the other one of the control channel or the data channel. In this particular example, n=13 and z=27. However, the values for n and z are not limited to 13 and 27, respectively.

Second Example Embodiment

At 524, the first device may determine that a same beam will be used as the first beam and the second beam. For example, referring to FIGS. 4A and 4F, first device 434 may determine the mapping by determining 440 that the first beam and the second beam are the same beam. In one configuration, the first device 434 may know a priori that the same beam will be used for the first beam and the second beam. Optionally, the first device 434 may receive an indication that the same beam will be used for transmitting the control channel and the data channel. For example, one of the beams 401, 403, 405, 407, 409, 411, 413, 415 that were used for transmitting BRS in FIG. 4A may be used for the control channel and the data channel, or one of the beams 404, 405, 406, 412, 413, 414 that were used for transmitting BRRS in FIG. 4A may be used for the control channel and the data channel.

Third Example Embodiment

At 526, the first device may determine the mapping by determining that a first subarray associated with the first beam is quasi co-located with a second subarray associated with the second beam. For example, referring to FIGS. 4A and 4F, the first device 434 and/or the second device 436 may determine, for example, that $beam_{13}$ 413 has the most desirable channel characteristics and will be used for transmitting either the control channel 462 or the data channel 464. The first device 434 may determine that the subarray (e.g., antenna subarray if first device 434 is a UE and antenna ports if first device 434 is an mmW base station) used for receiving $beam_{13}$ 413 is quasi co-located with the subarray used for receiving $beam_{27}$ 427, and thus select $beam_{27}$ 427 for the other one of the control channel 462 or the data channel 464.

At 528, the first device may determine $beam_z$ will be used as the first beam associated with the first type of channel when $beam_n$ is used as the second beam associated with the second type of channel based on the first subarray being quasi co-located with the second subarray. For example, referring to FIG. 4F, The first device 434 may determine that the subarray (e.g., antenna subarray if first device 434 is a UE and antenna ports if first device 434 is an mmW base station) used for receiving $beam_{13}$ 413 is quasi co-located with the subarray used for receiving $beam_{27}$ 427, and thus select $beam_{27}$ 427 for the other one of the control channel 462 or the data channel 464. In this particular example, n=13 and z=27. However, the values for n and z are not limited to 13 and 27, respectively.

Fourth Example Embodiment

At 530, the first device may receive, from the second device, an indication that the $beam_n$ is correlated with the $beam_{n+a}$ and the $beam_v$ is correlated with the $beam_{v+b}$. For example, referring to FIG. 4F, the first device 434 may receive, from the second device 436, an indication that the $beam_n$ is correlated with the $beam_{n+a}$ and/or $beam_v$ is correlated with the $beam_{v+b}$. In one aspect, the indication may be received via control channel (e.g., PDCCH) signaling or RRC signaling.

At 532, the first device may determine the mapping by determining a first correlation between the $beam_n$ and the $beam_{n+a}$ and a second correlation between the beam, with the $beam_{v+b}$. For example, referring to FIG. 4F, first device 434 may determine the mapping by correlating 440 one of the BRS beams used as either the control channel 462 or the data channel 464 with one of the BRRS beams used as the other one of the control channel 462 or the data channel. For example, $beam_n$ (e.g., $beam_5$ in FIG. 4A) may be correlated with $beam_{n+a}$ (e.g., $beam_6$ in FIG. 4A) and $beam_v$ (e.g., $beam_{13}$ in FIG. 4A) may be correlated with $beam_{v+b}$ (e.g., $beam_{12}$ in FIG. 4A), where $beam_n$ and $beam_{n+a}$ are both used to transmit the BRS, and $beam_v$ and $beam_{v+b}$ are both used to transmit the BRRS.

At 534, the first device may determine that the $beam_{n+a}$ will be used as the second beam associated with the second type of channel when the $beam_n$ is used as the first beam associated with the first type of channel based on the correlation. For example, referring to FIG. 4F, In a first configuration, the first device 434 may determine 440 that beam$_{n+a}$ (e.g., beam$_6$ 406 in FIG. 4A) may be used for either the control channel 462 or the data channel 464 when the beam$_n$ (e.g., beam$_5$ 405 in FIG. 4A) is used for the other one of the control channel 462 or the data channel 464.

At 536, the first device may determine that the beam$_n$ will be used as the first beam associated with the first type of channel when the beam$_{n+a}$ is used as the second beam associated with the second type of channel based on the correlation. For example, referring to FIG. 4F, in a first configuration, the first device 434 may determine 440 that beam$_{n+a}$ (e.g., beam$_6$ 406 in FIG. 4A) may be used for either the control channel 462 or the data channel 464 when the beam$_n$ (e.g., beam$_5$ 405 in FIG. 4A) is used for the other one of the control channel 462 or the data channel 464. Alternatively, in the first configuration, the first device 434 may determine that beam$_{v+b}$ (e.g., beam$_{12}$ 412 in FIG. 4A) may be used for either the control channel 462 or the data channel 464 when the beam$_v$ (e.g., beam$_{13}$ 413 in FIG. 4A) is used as the other one of the control channel 462 or the data channel 464. In a second configuration, the first device 434 may determine 440 that beam$_n$ (e.g., beam$_5$ 405 in FIG. 4A) may be used for either the control channel 462 or the data channel 464 when the beam$_{n+a}$ (e.g., beam$_6$ 406 in FIG. 4A) is used as the other one of the control channel 462 or the data channel 464. Alternatively, in the second configuration, the first device 434 may determine 440 that beam$_v$ (e.g., beam$_{13}$ 413 in FIG. 4A) may be used for either the control channel 462 or the data channel 464 when the beam$_{v+b}$ (e.g., beam$_{12}$ 412 in FIG. 4A) is used as the other one of the control channel 462 or the data channel 464.

Fifth Example Embodiment

As seen in FIG. 5C, at 538, the first device may determine the mapping by determining a third correlation between the beam$_n$ and the beam$_v$ and a fourth correlation between the beam$_{n+a}$ and the beam$_{v+b}$. For example, referring to FIG. 4F, the first device 434 may determine the mapping by correlating 440 one of the BRS beams used as the control channel with another one of the BRS beams used as the data channel. Additionally and/or alternatively, first device 434 may determine the mapping by correlating 440 one of the BRRS beams used as the control channel with another one of the BRRS beams used as the data channel. For example, beam$_n$ (e.g., beam$_5$ 405 in FIG. 4A) may be correlated with beam$_v$ (e.g., beam$_{13}$ 413 in FIG. 4A) and beam$_{n+a}$ (e.g., beam$_6$ 406 in FIG. 4A) may be correlated with beam$_{v+b}$ (e.g., beam$_{12}$ 412 in FIG. 4A). For example, beam$_n$ and beam$_v$ may both used to transmit the BRS and beam$_{n+a}$ and beam$_{v+b}$ are both used to transmit the BRRS.

At 540, the first device may determine that the beam$_v$ will be used as the second beam associated with the second type of channel when the beam$_n$ is used as the first beam associated with the first type of channel based on the correlation. For example, referring to FIG. 4F, the first device 434 may determine that beam$_v$ will be used as either the control channel 462 or the data channel 464 when beam$_n$ is used the other one of the control channel 462 or the data channel 464. Alternatively, the first device 434 may determine that beam$_{v-b}$ will be used as either the control channel 462 or the data channel 464 when beam$_{n+a}$ is used the other one of the control channel 462 or the data channel 464.

Sixth Example Embodiment

At 542, the first device may determine the mapping by determining that beam$_x$ will be used as the first beam and that beam$_z$ will be used as the second beam. For example, referring to FIG. 4F, the first device 434 may determine the mapping by determining that beam$_x$ will be used as the first beam and that beam$_z$ will be used as the second beam. Beam$_x$ and beam$_z$ may not be correlated in any obvious manner, and thus the mapping in the sixth example embodiment may be an independent relationship determined by the second device 436.

At 544, the first device may receive the first beam associated with the first type of channel and the second beam associated with the second type of channel. In an aspect, the first beam and the second beam may be received from a second device. For example, referring to FIG. 4F, after determining 440 the relationship between the first beam and the second beam based on one example embodiments discussed supra, the first device 434 may receive the control channel 462 and the data channel 464.

Figure 6:
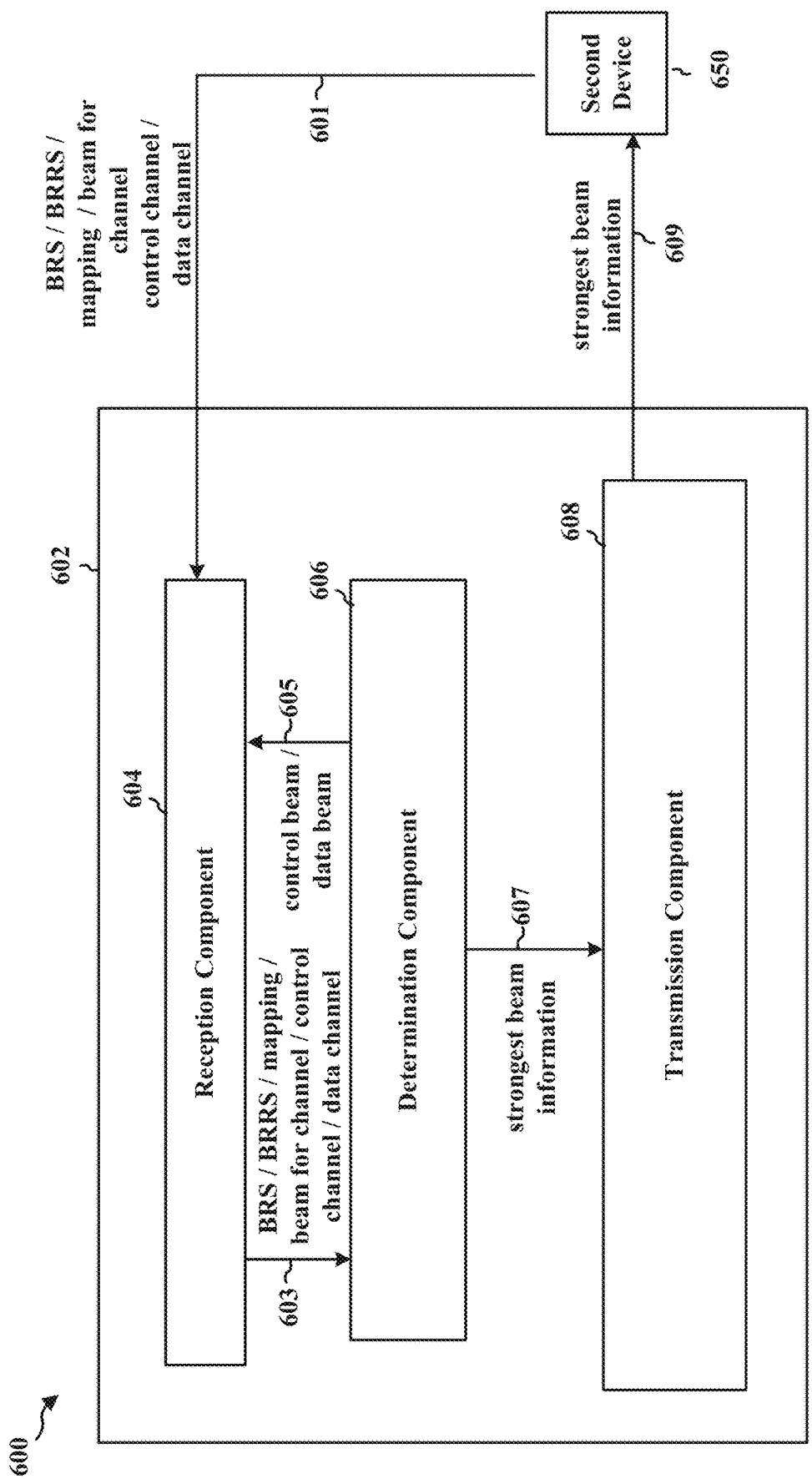
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a first device (e.g., first device 434, UE 104, 350, 431, or mmW base station 180, 310, 432) in communication with a second device 650 (e.g., second device 436, UE 104, 350, 431, or mmW base station 180, 310, 432). The apparatus includes a reception component 604 that may receive first set of beams associated with a BRS 601 and a second set of beams associated with the BRS 601. In an aspect, the first set of beams may be different than the second set of beams. Reception component 604 may transmit a signal 603 associated with the BRS 601 to determination component 606. Determination component 606 may determine a strongest beam in the first set of beams and a strongest beam in the second set of beams. In one aspect, the strongest beam in the first set of beams may be beam$_n$ and the strongest beam in the second set of beams may be beam$_v$. Determination component 606 may send a signal 607 associated with the strongest beam information (e.g., beam$_n$ and beam$_v$) to the transmission component 608. Transmission component 608 may send a signal 609 associated with the strongest beam information for the first and second sets of beams to the second device 650. Reception component 604 may receive a third set of beams associated with a BRRS 601 and a fourth set of beams associated with the BRRS 601 from the second device 650. In one aspect, the third set of beams may include the beam$_n$ and at least one beam adjacent to the beam$_n$, and the fourth set of beams may include the beam$_v$ and at least one beam adjacent to the beam$_v$. Reception component may send a signal 603 associated with the BRRS to determination component 606. Determination component 606 may determine a strongest beam in the third set of beams and a strongest beam in the fourth set of beams. In an aspect, the strongest beam in the third set of beams may be beam$_{n+a}$ and the strongest beam in the fourth set of beams may be beam$_{v+b}$. Determination component 606 may send a signal associated with the strongest beam information for the third and fourth set of beams (e.g., beam$_{n+a}$ and beam$_{v+b}$) to transmission component 608. Transmission component 608 may send a signal 609 associated with the strongest beam information for the third and fourth sets of beams to the second device 650. Reception component 604 may receive information 601 indicating that either beam$_n$ or beam$_v$ will be used as the first beam associated with the first type of channel or the second beam associated with the second type of channel. Reception component 604 may receive mapping information 601 that indicates that the first beam and the second beam differ in width by the fixed amount. Reception component 604 may send a signal 603 associated with the difference in beam width to the determination component 606. Determination component 606 may determine a mapping between a first beam associated with a first type of channel and a second beam associated with a second type of channel. In one aspect, the first type of channel may be different than the second type of channel. In one aspect, the determination component 606 may determine the mapping by determining that the first beam and the second beam differ in width by a fixed amount. In a first example embodiment, determination component 606 may determine the mapping by determining $beam_z$ will be used as the first beam associated with the first type of channel when $beam_n$ is used as the second beam associated with the second type of channel. In an aspect, the $beam_z$ and the $beam_n$ may differ in width by the fixed amount. In a second example embodiment, determination component 606 may determine that a same beam will be used as the first beam and the second beam (e.g., based on a priori knowledge at the determination component 606 or from a message from the second device 650). In a third example embodiment, determination component 606 may determine the mapping by determining that a first subarray associated with the first beam is quasi co-located with a second subarray associated with the second beam. For example, determination component 606 may determine $beam_z$ will be used as the first beam associated with the first type of channel when $beam_n$ is used as the second beam associated with the second type of channel based on the first subarray being quasi co-located with the second subarray. In a fourth example embodiment, reception component 604 may receive, from the second device 650, an indication 601 (e.g., mapping) that the $beam_n$ is correlated with the $beam_{n+a}$ and the $beam_v$ is correlated with the $beam_{v+b}$. Reception component 604 may send a signal 603 associated with the mapping to determination component 606. Determination component 606 may determine the mapping by determining a first correlation between the $beam_n$ and the $beam_{n+a}$ and a second correlation between the $beam_v$ with the $beam_{v+b}$. For example, determination component 606 may determine that the $beam_n$ will be used as the first beam associated with the first type of channel when the $beam_{n+a}$ is used as the second beam associated with the second type of channel based on the correlation. In a fifth example embodiment, determination component 606 may determine the mapping by determining a third correlation between the $beam_n$ and the $beam_v$ and a fourth correlation between the $beam_{n+a}$ and the $beam_{v+b}$. For example, determination component 606 may determine that the $beam_v$ will be used as the second beam associated with the second type of channel when the $beam_n$ is used as the first beam associated with the first type of channel based on the correlation. In a sixth example embodiment, reception component 604 may receive information 601 (e.g., independent mapping) indicating that $beam_x$ will be used as the first beam and that $beam_z$ will be used as the second beam. Reception component 604 may send a signal 603 associated with the independent mapping to determination component 606. Determination component 606 may determine that $beam_x$ will be used as the first beam and that $beam_z$ will be used as the second beam. Information 605 associated with the determined beams for the control channel and the data channel determined in the first, second, third, fourth, fifth, and sixth example embodiments may be sent to reception component 604. Reception component 604 may then receive the control channel in one beam and the associated data channel 601 in a different beam.

The apparatus may include additional components that perform each of the blocks of the algorithm in the aforementioned flowcharts of FIGS. 5A-5C. As such, each block in the aforementioned flowcharts of FIGS. 5A-5C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
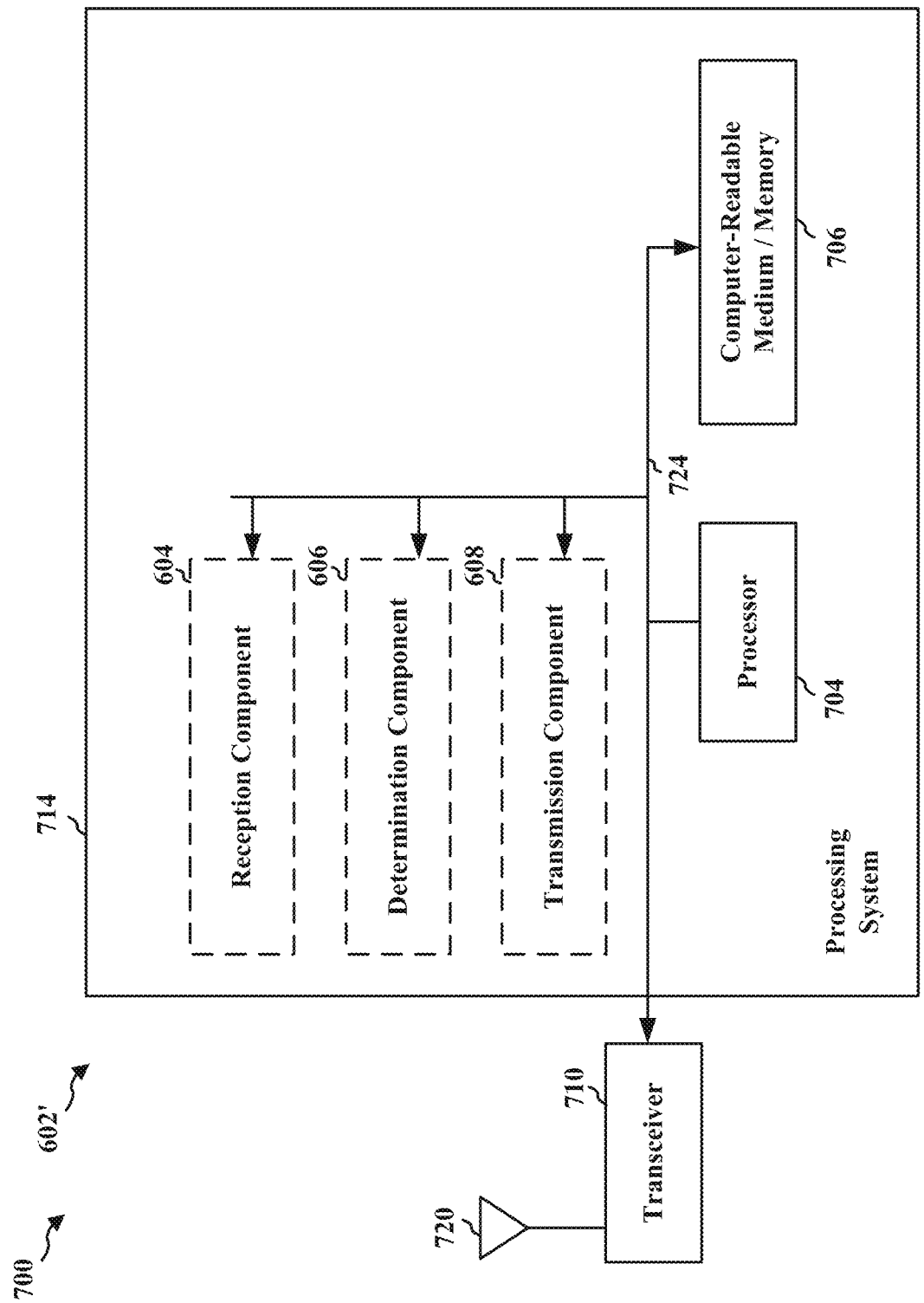
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 608, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication may include means for determining a mapping between a first beam associated with a first type of channel and a second beam associated with a second type of channel. In an aspect, the first type of channel may be different than the second type of channel. In an aspect, the first type of channel is one of a control channel or a data channel and the second type of channel is the other one of the control channel or the data channel. In another configuration, the apparatus 602/602' for wireless communication may include means for receiving, from the second device, an indication that the first beam and the second beam differ in width by the fixed amount. In a first configuration, the means for determining the mapping may be configured to determine that the first beam and the second beam differ in width by a fixed amount. For example, the means for determining the mapping may be configured to determine beam, will be used as the first beam associated with the first type of channel when beam, is used as the second beam associated with the second type of channel. In an aspect, the beam, and the beam, may differ in width by the fixed amount. In another configuration, the means for determining the mapping may be configured to determine that a same beam will be used as the first beam and the second beam. In a further configuration, the means for determining the mapping may be configured to determine that a first subarray associated with the first beam is quasi co-located with a second subarray associated with the second beam. For example, the means for determining the mapping may be configured to determine beam, will be used as the first beam associated with the first type of channel when beam, is used as the second beam associated with the second type of channel based on the first subarray being quasi co-located with the second subarray. In a further configuration, the apparatus 602/602' for wireless communication may include means for receiving a first set of beams associated with a BRS and a second set of beams associated with the BRS. In an aspect, the first set of beams may be different than the second set of beams. In another configuration, the apparatus 602/602' for wireless communication may include means for determining a strongest beam in the first set of beams and a strongest beam in the second set of beams. In an aspect, the strongest beam in the first set of beams may be $beam_n$ and the strongest beam in the second set of beams may be $beam_v$. In a further configuration, the apparatus 602/602' for wireless communication may include means for receiving a third set of beams associated with a BRRS and a fourth set of beams associated with the BRRS from the second device. In one aspect, the third set of beams may include the $beam_n$ and at least one beam adjacent to the $beam_n$, and the fourth set of beams may include the $beam_v$ and at least one beam adjacent to the $beam_v$. In one configuration, the apparatus 602/602' for wireless communication may include means for determining a strongest beam in the third set of beams and a strongest beam in the fourth set of beams. In an aspect, the strongest beam in the third set of beams may be $beam_{n+a}$ and the strongest beam in the fourth set of beams may be $beam_{v+b}$. In another configuration, the apparatus 602/602' for wireless communication may include means for transmitting information associated with the strongest beam in the third set of beams and the strongest beam in the fourth set of beams to the second device. In an aspect, the means for determining the mapping is configured to determine a first correlation between the $beam_n$ and the $beam_{n+a}$ and a second correlation between the beam, with the $beam_{v+b}$, and/or determine a third correlation between the $beam_n$ and the $beam_v$ and a fourth correlation between the $beam_{n+a}$ and the $beam_{v+b}$. In one configuration, the apparatus 602/602' for wireless communication may include means for receiving, from the second device, information associated with at least one of the first correlation, the second correlation, the third correlation, or the fourth correlation. In an aspect, the information may be received via control channel signaling or RRC signaling. In an aspect, the means for determining the mapping may be configured to determine that the $beam_{n+a}$ will be used as the second beam associated with the second type of channel when the $beam_n$ is used as the first beam associated with the first type of channel based on the correlation. In another aspect, the means for determining the mapping may be configured to determine that the $beam_v$ will be used as the second beam associated with the second type of channel when the $beam_n$ is used as the first beam associated with the first type of channel based on the correlation. In a further aspect, the means for determining the mapping may be configured to determine that that the $beam_n$ will be used as the first beam associated with the first type of channel when the $beam_{n+a}$ is used as the second beam associated with the second type of channel based on the correlation. In still another aspect, the means for determining the mapping may be configured to determining that $beam_x$ will be used as the first beam and that $beam_z$ will be used as the second beam. In one configuration, the first device may be a UE and the second device may be a mmW base station. In another configuration, the first device may be a mmW base station and the second device may be a UE. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first device, comprising:
   memory; and
   one or more processors coupled to the memory and configured to cause the first device to:
      receive, from a second device, radio resource control (RRC) signaling that informs the first device of a first correlation between a first beam associated with a control channel and a second beam associated with a data channel and a second correlation between a third beam and a fourth beam;
      receive, from the second device, information that indicates the first beam will be used for the control channel; and
      receive, from the second device, the data channel on the second beam based on the information from the second device that indicates the first beam will be used for the control channel and the RRC signaling that informs the first device of the first correlation between the first beam associated with the control channel and the second beam associated with the data channel.

2. The apparatus of claim 1, wherein an indication for at least one of the first correlation or the second correlation is further comprised in control channel signaling.

3. The apparatus of claim 1, wherein an indication for at least one of the first correlation or the second correlation is further comprised in physical downlink control channel (PDCCH) signaling.

4. The apparatus of claim 1, wherein the first beam is associated with a physical downlink control channel (PDCCH), and the second beam is associated with a physical downlink shared channel (PDSCH).

5. The apparatus of claim 1, wherein the one or more processors are further configured to cause the first device to:
   receive a set of beams associated with a corresponding reference signal, wherein the set of beams includes at least one of the first beam, the second beam, the third beam, or the fourth beam; and
   indicate a strongest beam in the set of beams.

6. The apparatus of claim 5, wherein the first beam is the strongest beam.

7. The apparatus of claim 1, wherein the first device comprises a user equipment (UE) and the second device comprises a base station.

8. The apparatus of claim 1, further comprising one or more antennas coupled to the one or more processors.

9. The apparatus of claim 1, wherein the first beam is further associated with a reference signal for synchronization.

10. The apparatus of claim 9, wherein the reference signal is in a time resource for the synchronization.

11. The apparatus of claim 1, wherein the first beam and the third beam are associated with the control channel, and the second beam and the fourth beam are associated with the data channel.

12. The apparatus of claim 1, wherein the one or more processors are individually or in combination configured to receive the RRC signaling that informs the first device of the first correlation, receive the information that indicates the first beam will be used for the control channel, and receive the data channel on the second beam.

13. The apparatus of claim 1, wherein the first device is a user equipment (UE), and the first beam is further associated with a reference signal for synchronization.

14. The apparatus of claim 1, wherein the first device is a user equipment (UE), and the RRC signaling informs the UE of the second correlation between the third beam for the control channel and the fourth beam for the data channel.

15. An apparatus for wireless communication at a first device, comprising:
   memory; and
   one or more processors coupled to the memory and configured to cause the first device to:
      receive, from a second device, radio resource control (RRC) signaling that informs the first device of a correlation between a first beam associated with a control channel and a second beam associated with a data channel;
      receive a first set of beams associated with a reference signal and a second set of beams associated with the reference signal, wherein the first set of beams is different than the second set of beams;
      determine a first strongest beam in the first set of beams and a second strongest beam in the second set of beams;
      transmit additional information associated with the first strongest beam in the first set of beams and the second strongest beam in the second set of beams to the second device;
      receive, from the second device, information that indicates the first beam will be used for the control channel; and
      receive, from the second device, the data channel on the second beam based on the RRC signaling that informs the first device of the correlation between the first beam associated with the control channel and the information from the second device that indicates the first beam will be used for the control channel.

16. The apparatus of claim 15, wherein the one or more processors are individually or in combination configured to receive the RRC signaling that informs the first device of the correlation, receive the first set of beams, determine the first strongest beam, transmit the additional information, receive the information that indicates the first beam will be used for the control channel, and receive the data channel on the second beam.

17. A method of wireless communication at a first device, comprising:
   receiving, from a second device, radio resource control (RRC) signaling informing the first device of a first correlation between a first beam associated with a control channel and a second beam associated with a data channel and a second correlation between a third beam and a fourth beam;
   receiving, from the second device, information indicating that the first beam will be used for the control channel; and
   receiving, from the second device, the data channel on the second beam based on the information from the second device indicating that the first beam will be used for the control channel and the RRC signaling that informs the first device of the first correlation between the first beam associated with the control channel and the second beam associated with the data channel.

18. The method of claim 17, wherein an indication for at least one of the first correlation or the second correlation is further comprised in control channel signaling.

19. The method of claim 17, wherein an indication for at least one of the first correlation or the second correlation is further comprised in physical downlink control channel (PDCCH) signaling.

20. The method of claim 17, wherein the second beam is associated with a physical downlink shared channel (PDSCH).

21. The method of claim 17, wherein the first beam is associated with a physical downlink control channel (PDCCH), and the second beam is associated with a physical downlink shared channel (PDSCH).

22. The method of claim 17, further comprising:
receiving a set of beams associated with a corresponding reference signal, the set of beams including at least one of the first beam, the second beam, the third beam, or the fourth beam; and
indicating a strongest beam in the set of beams.

23. The method of claim 22, wherein indicating the strongest beam includes indicating that the first beam is the strongest beam.

24. The method of claim 17, wherein the first device comprises a user equipment (UE) and the second device comprises a base station.

25. The method of claim 17, wherein the first beam is further associated with a reference signal for synchronization.

26. The method of claim 25, wherein the reference signal is in a time resource for the synchronization.

27. The method of claim 17, wherein the first beam and the third beam are associated with the control channel, and the second beam and the fourth beam are associated with the data channel.

28. A method of wireless communication at a first device, comprising:
receiving, from a second device, radio resource control (RRC) signaling informing the first device of a correlation between a first beam associated with a control channel and a second beam associated with a data channel;
receiving a first set of beams associated with a reference signal and a second set of beams associated with the reference signal, the first set of beams being different than the second set of beams;
determining a first strongest beam in the first set of beams and a second strongest beam in the second set of beams;
transmitting additional information associated with the first strongest beam in the first set of beams and the second strongest beam in the second set of beams to the second device;
receiving, from the second device, information indicating that the first beam will be used for the control channel; and
receiving, from the second device, the data channel on the second beam based on the RRC signaling that informs the first device of the correlation between the first beam associated with the control channel and the information from the second device indicating that the first beam will be used for the control channel.

29. An apparatus for wireless communication at a first device, comprising:
means for receiving, from a second device, radio resource control (RRC) signaling informing the first device of a first correlation between a first beam associated with a control channel and a second beam associated with a data channel and a second correlation between a third beam and a fourth beam;
means for receiving, from the second device, information indicating that the first beam will be used for the control channel; and
means for receiving, from the second device, the data channel on the second beam based on the information from the second device indicating that the first beam will be used for the control channel and the RRC signaling that informs the first device of the first correlation between the first beam associated with the control channel and the second beam associated with the data channel.

30. The apparatus of claim 29, wherein an indication for at least one of the first correlation or the second correlation is further comprised in control channel signaling.

31. The apparatus of claim 29, wherein the first beam is associated with a physical downlink control channel (PDCCH), and the second beam is associated with a physical downlink shared channel (PDSCH).

32. The apparatus of claim 29, wherein the first beam is further associated with a reference signal for synchronization.

33. The apparatus of claim 32, wherein the reference signal is in a time resource for the synchronization.

34. The apparatus of claim 29, wherein the first beam and the third beam are associated with the control channel, and the second beam and the fourth beam are associated with the data channel.

35. A non-transitory computer-readable storage medium storing computer executable code at a first device, the code when executed by one or more processors causes the first device to:
receive, from a second device, radio resource control (RRC) signaling informing the first device of a first correlation between a first beam associated with a control channel and a second beam associated with a data channel and a second correlation between a third beam and a fourth beam;
receive, from the second device, information indicating that the first beam will be used for the control channel; and
receive, from the second device, the data channel on the second beam based on the information from the second device indicating that the first beam will be used for the control channel and the RRC signaling that informs the first device of the first correlation between the first beam associated with the control channel and the second beam associated with the data channel.

36. The non-transitory computer-readable storage medium of claim 35, wherein an indication for at least one of the first correlation or the second correlation is further comprised in control channel signaling.

37. The non-transitory computer-readable storage medium of claim 35, wherein the first beam is associated with a physical downlink control channel (PDCCH), and the second beam is associated with a physical downlink shared channel (PDSCH).

38. The non-transitory computer-readable storage medium of claim 35, wherein the first beam is further associated with a reference signal for synchronization.

39. The non-transitory computer-readable storage medium of claim 38, wherein the reference signal is in a time resource for the synchronization.

40. The non-transitory computer-readable storage medium of claim 35, wherein the first beam and the third beam are associated with the control channel, and the second beam and the fourth beam are associated with the data channel.

41. An apparatus for wireless communication at a second device, comprising:
memory; and
one or more processors coupled to the memory and configured to cause the second device to:
provide, for a first device, radio resource control (RRC) signaling that informs the first device of a first correlation between a first beam associated with a control channel and a second beam associated with a data channel and a second correlation between a third beam and a fourth beam;
provide, for the first device, information that indicates the first beam will be used for the control channel; and
provide, for the first device, the data channel on the second beam based on the information from the second device that indicates the first beam will be used for the control channel and the RRC signaling that informs the first device of the first correlation between the first beam associated with the control channel and the second beam associated with the data channel.

42. The apparatus of claim 41, wherein an indication for at least one of the first correlation or the second correlation is further comprised in control channel signaling.

43. The apparatus of claim 41, wherein the first beam is associated with a physical downlink control channel (PDCCH), and the second beam is associated with a physical downlink shared channel (PDSCH).

44. The apparatus of claim 41, wherein the one or more processors are individually or in combination configured to provide the RRC signaling that informs the first device of the first correlation, provide the information the first beam will be used for the control channel, and provide the data channel on the second beam.

45. The apparatus of claim 41, wherein the first beam is further associated with a reference signal for synchronization.

46. A method of wireless communication at a second device, comprising:
providing, for a first device, radio resource control (RRC) signaling informing the first device of a first correlation between a first beam associated with a control channel and a second beam associated with a data channel and a second correlation between a third beam and a fourth beam;
providing, for the first device, information indicating that the first beam will be used for the control channel; and
providing, for the first device, the data channel on the second beam based on the information from the second device indicating that the first beam will be used for the control channel and the RRC signaling that informs the first device of the first correlation between the first beam associated with the control channel and the second beam associated with the data channel.

47. The method of claim 46, wherein an indication for at least one of the first correlation or the second correlation is further comprised in control channel signaling.

48. The method of claim 46, wherein the first beam is associated with a physical downlink control channel (PDCCH), and the second beam is associated with a physical downlink shared channel (PDSCH).

49. The method of claim 46, wherein the first beam is further associated with a reference signal for synchronization.

50. The method of claim 49, wherein the reference signal is in a time resource for the synchronization.

51. The method of claim 46, wherein the first beam and the third beam are associated with the control channel, and the second beam and the fourth beam are associated with the data channel.

52. An apparatus for wireless communication at a second device, comprising:
memory; and
one or more processors coupled to the memory and configured to cause the second device to:
provide, for a first device, radio resource control (RRC) signaling that informs the first device of a correlation between a first beam associated with a control channel and a second beam associated with a data channel;
provide a first set of beams associated with a reference signal and a second set of beams associated with the reference signal, wherein the first set of beams is different than the second set of beams;
receive additional information associated with a first strongest beam in the first set of beams and a second strongest beam in the second set of beams;
provide, for the first device, information that indicates the first beam will be used for the control channel; and
provide, for the first device, the data channel on the second beam based on the RRC signaling that informs the first device of the correlation between the first beam associated with the control channel and the second beam associated with the data channel and the information from the second device that indicates the first beam will be used for the control channel.

53. The apparatus of claim 52, wherein the one or more processors are individually or in combination configured to provide the RRC signaling that informs the first device of the correlation, provide the first set of beams, receive the additional information, provide the information that indicates the first beam will be used for the control channel, and provide the data channel on the second beam.

54. A method of wireless communication at a second device, comprising:
providing, for a first device, radio resource control (RRC) signaling informing the first device of a correlation between a first beam associated with a control channel and a second beam associated with a data channel;
providing a first set of beams associated with a reference signal and a second set of beams associated with the reference signal, the first set of beams being different than the second set of beams;
receiving additional information associated with a first strongest beam in the first set of beams and a second strongest beam in the second set of beams;
providing, for the first device, information indicating that the first beam will be used for the control channel; and
providing, for the first device, the data channel on the second beam based on the RRC signaling that informs the first device of the correlation between the first beam associated with the control channel and the second beam associated with the data channel and the information from the second device indicating that the first beam will be used for the control channel.

55. An apparatus for wireless communication at a second device, comprising:
- means for providing, for a first device, radio resource control (RRC) signaling informing the first device of a correlation between a first beam associated with a control channel and a second beam associated with a data channel;
- means for providing a first set of beams associated with a reference signal and a second set of beams associated with the reference signal, the first set of beams being different than the second set of beams;
- means for receiving additional information associated with a first strongest beam in the first set of beams and a second strongest beam in the second set of beams;
- means for providing, for the first device, information indicating that the first beam will be used for the control channel; and
- means for providing, for the first device, the data channel on the second beam based on the RRC signaling that informs the first device of the correlation between the first beam associated with the control channel and the second beam associated with the data channel and the information from the second device indicating that the first beam will be used for the control channel.

56. A non-transitory computer-readable storage medium storing computer executable code at a second device, the code when executed by one or more processors causes the second device to:
- provide, for a first device, radio resource control (RRC) signaling informing the first device of a correlation between a first beam associated with a control channel and a second beam associated with a data channel;
- provide a first set of beams associated with a reference signal and a second set of beams associated with the reference signal, the first set of beams being different than the second set of beams;
- receive additional information associated with a first strongest beam in the first set of beams and a second strongest beam in the second set of beams;
- provide, for the first device, information indicating that the first beam will be used for the control channel; and
- provide, for the first device, the data channel on the second beam based on the RRC signaling that informs the first device of the correlation between the first beam associated with the control channel and the second beam associated with the data channel and the information from the second device indicating that the first beam will be used for the control channel.

57. An apparatus for wireless communication at a first device, comprising:
- means for receiving, from a second device, radio resource control (RRC) signaling informing the first device of a correlation between a first beam associated with a control channel and a second beam associated with a data channel;
- means for receiving a first set of beams associated with a reference signal and a second set of beams associated with the reference signal, the first set of beams being different than the second set of beams;
- means for determining a first strongest beam in the first set of beams and a second strongest beam in the second set of beams;
- means for transmitting additional information associated with the first strongest beam in the first set of beams and the second strongest beam in the second set of beams to the second device;
- means for receiving, from the second device, information indicating that the first beam will be used for the control channel; and
- means for receiving, from the second device, the data channel on the second beam based on the RRC signaling that informs the first device of the correlation between the first beam associated with the control channel and the second beam associated with the data channel and the information from the second device indicating that the first beam will be used for the control channel.

58. A non-transitory computer-readable storage medium storing computer executable code at a first device, the code when executed by one or more processors causes the first device to:
- receive, from a second device, radio resource control (RRC) signaling informing the first device of a correlation between a first beam associated with a control channel and a second beam associated with a data channel;
- receive a first set of beams associated with a reference signal and a second set of beams associated with the reference signal, the first set of beams being different than the second set of beams;
- determine a first strongest beam in the first set of beams and a second strongest beam in the second set of beams;
- transmit additional information associated with the first strongest beam in the first set of beams and the second strongest beam in the second set of beams to the second device;
- receive, from the second device, information indicating that the first beam will be used for the control channel; and
- receive, from the second device, the data channel on the second beam based on the RRC signaling that informs the first device of the correlation between the first beam associated with the control channel and the second beam associated with the data channel and the information from the second device indicating that the first beam will be used for the control channel.

59. A non-transitory computer-readable storage medium storing computer executable code at a second device, the code when executed by one or more processors causes the second device to:
- provide, for a first device, radio resource control (RRC) signaling informing the first device of a first correlation between a first beam associated with a control channel and a second beam associated with a data channel and a second correlation between a third beam and a fourth beam;
- provide, for the first device, information indicating that the first beam will be used for the control channel; and
- provide, for the first device, the data channel on the second beam based on the information from the second device indicating that the first beam will be used for the control channel and the RRC signaling that informs the first device of the first correlation between the first beam associated with the control channel and the second beam associated with the data channel.

60. The non-transitory computer-readable storage medium of claim 59, wherein an indication for at least one of the first correlation or the second correlation is further comprised in control channel signaling.

61. The non-transitory computer-readable storage medium of claim 59, wherein the first beam is associated with a physical downlink control channel (PDCCH), and the second beam is associated with a physical downlink shared channel (PDSCH).

62. The non-transitory computer-readable storage medium of claim 59, wherein the first beam is further associated with a reference signal for synchronization.

63. The non-transitory computer-readable storage medium of claim 62, wherein the reference signal is in a time resource for the synchronization.

64. The non-transitory computer-readable storage medium of claim 59, wherein the first beam and the third beam are associated with the control channel, and the second beam and the fourth beam are associated with the data channel.

65. An apparatus for wireless communication at a second device, comprising:
   means for providing, for a first device, radio resource control (RRC) signaling informing the first device of a first correlation between a first beam associated with a control channel and a second beam associated with a data channel and a second correlation between a third beam and a fourth beam;
   means for providing, for the first device, information indicating that the first beam will be used for the control channel; and
   means for providing, for the first device, the data channel on the second beam based on the information from the second device indicating that the first beam will be used for the control channel and the RRC signaling that informs the first device of the first correlation between the first beam associated with the control channel and the second beam associated with the data channel.

66. The apparatus of claim 65, wherein an indication for at least one of the first correlation or the second correlation is further comprised in control channel signaling.

67. The apparatus of claim 65, wherein the first beam is associated with a physical downlink control channel (PDCCH), and the second beam is associated with a physical downlink shared channel (PDSCH).

68. The apparatus of claim 65, wherein the first beam is further associated with a reference signal for synchronization.

69. The apparatus of claim 68, wherein the reference signal is in a time resource for the synchronization.

70. The apparatus of claim 65, wherein the first beam and the third beam are associated with the control channel, and the second beam and the fourth beam are associated with the data channel.

* * * * *